United States Patent
Koral et al.

(10) Patent No.: US 12,432,244 B2
(45) Date of Patent: Sep. 30, 2025

(54) HOME GATEWAY MONITORING FOR VULNERABLE HOME INTERNET OF THINGS DEVICES

(71) Applicant: AT&T Intellectual Property I, L.P., Atlanta, GA (US)

(72) Inventors: Yaron Koral, Cherry Hill, NJ (US); Shraboni Jana, Danville, CA (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 212 days.

(21) Appl. No.: 17/702,858

(22) Filed: Mar. 24, 2022

(65) Prior Publication Data

US 2023/0308467 A1 Sep. 28, 2023

(51) Int. Cl.
*H04L 9/40* (2022.01)
*G16Y 30/10* (2020.01)

(52) U.S. Cl.
CPC .......... *H04L 63/1433* (2013.01); *G16Y 30/10* (2020.01); *H04L 63/105* (2013.01)

(58) Field of Classification Search
None
See application file for complete search history.

(56) References Cited

U.S. PATENT DOCUMENTS

| | | | | |
|---|---|---|---|---|
| 3,603,142 A | * | 9/1971 | Saylak | G01N 27/205 73/104 |
| 8,613,080 B2 | * | 12/2013 | Wysopal | G06F 21/577 726/19 |
| 9,191,409 B2 | * | 11/2015 | Doctor | H04L 63/1433 |
| 9,407,624 B1 | * | 8/2016 | Myers | H04L 63/105 |
| 9,516,053 B1 | * | 12/2016 | Muddu | G06F 16/9024 |
| 9,591,016 B1 | * | 3/2017 | Palmieri | H04L 63/1433 |
| 9,735,970 B1 | * | 8/2017 | Shohat | H04L 9/321 |
| 9,912,687 B1 | * | 3/2018 | Wescoe | H04L 67/01 |
| 10,070,412 B1 | * | 9/2018 | Liu | H04W 8/005 |

(Continued)

FOREIGN PATENT DOCUMENTS

| EP | 4057570 A1 * | 9/2022 | G05B 19/042 |
|---|---|---|---|
| WO | WO-2017172434 A1 * | 10/2017 | G06F 11/1433 |

OTHER PUBLICATIONS

Zhou et al "Reviewing IoT Security via Logic Bugs in IoT Platforms and Systems," IEEE Internet of Things Journal, vol. 8, No. 14, Jul. 15, 2001, pp. 11621-11639 (Year: 2021).*

(Continued)

*Primary Examiner* — Luu T Pham
*Assistant Examiner* — James J Wilcox
(74) *Attorney, Agent, or Firm* — Hartman & Citrin LLC

(57) ABSTRACT

The concepts and technologies disclosed herein are directed to home gateway monitoring for vulnerable home Internet of Things ("IoT") devices. According to one aspect disclosed herein, a home gateway can scan a home network address space of a home network for an IoT device. The home gateway can perform a vulnerability test on the IoT device to determine whether the IoT device is vulnerable to a known vulnerability. In response to determining that the IoT device is vulnerable to the known vulnerability, the home gateway can change a device status of the IoT device to a vulnerable status and can change a permissions level of the IoT device to a quarantine permissions level.

15 Claims, 8 Drawing Sheets

(56) References Cited

U.S. PATENT DOCUMENTS

| | | | |
|---|---|---|---|
| 10,122,737 B1* | 11/2018 | McCorkendale | H04L 63/1416 |
| 10,128,914 B1* | 11/2018 | Calabrese | H04B 5/77 |
| 10,235,480 B2* | 3/2019 | Broodney | G06F 30/20 |
| 10,243,904 B1* | 3/2019 | Wescoe | H04L 51/212 |
| 10,313,384 B1* | 6/2019 | Banga | H04L 63/20 |
| 10,313,387 B1* | 6/2019 | Kras | H04L 63/1433 |
| 10,320,829 B1* | 6/2019 | Banga | H04L 63/1433 |
| 10,469,517 B1* | 11/2019 | Higbee | H04L 63/1433 |
| 10,716,006 B2* | 7/2020 | Raleigh | H04L 63/20 |
| 10,742,674 B1* | 8/2020 | McLinden | H04L 63/1458 |
| 10,791,140 B1* | 9/2020 | Dahlberg | H04L 51/234 |
| 10,805,888 B2* | 10/2020 | Park | H04W 52/286 |
| 10,812,521 B1* | 10/2020 | Sharifi Mehr | H04L 63/1433 |
| 10,841,839 B2* | 11/2020 | Raleigh | H04W 28/10 |
| 10,911,424 B2* | 2/2021 | Curtis | H04L 63/0428 |
| 10,917,429 B1* | 2/2021 | Patton | H04L 63/1433 |
| 10,931,304 B1* | 2/2021 | Bartling | H03M 7/6047 |
| 10,951,635 B2* | 3/2021 | Rayes | H04L 41/0661 |
| 10,972,508 B1* | 4/2021 | Dods | H04L 63/1433 |
| 11,005,732 B1* | 5/2021 | Quevedo | H04L 43/026 |
| 11,017,140 B1* | 5/2021 | Sloss | G06F 9/30134 |
| 11,018,959 B1* | 5/2021 | Neill | H04L 43/026 |
| 11,050,630 B2* | 6/2021 | AbiEzzi | H04L 67/12 |
| 11,106,801 B1* | 8/2021 | Levine | G06F 11/3692 |
| 11,115,799 B1* | 9/2021 | Du | H04L 63/205 |
| 11,128,636 B1* | 9/2021 | Jorasch | G06F 3/0346 |
| 11,128,665 B1* | 9/2021 | Sokolov | H04L 63/1408 |
| 11,132,447 B1* | 9/2021 | Sun | H04L 63/1458 |
| 11,171,960 B2* | 11/2021 | Levy | H04L 63/0227 |
| D939,580 S * | 12/2021 | Park | D14/495 |
| 11,196,804 B2* | 12/2021 | Badawy | H04L 63/10 |
| 11,200,324 B1* | 12/2021 | Manral | G06F 21/629 |
| 11,250,138 B2* | 2/2022 | Jones | G06F 21/577 |
| 11,256,828 B1* | 2/2022 | Machado | H04L 63/0428 |
| 11,276,283 B2* | 3/2022 | Pulluru | G08B 13/1427 |
| 11,316,885 B1* | 4/2022 | Miseiko | H04L 63/20 |
| 11,347,866 B2* | 5/2022 | Gourisetti | G06F 21/577 |
| 11,381,582 B1* | 7/2022 | Mohammed | G06F 30/31 |
| 11,388,169 B2* | 7/2022 | Badawy | G06F 16/9024 |
| 11,399,039 B2* | 7/2022 | Rubin | G06F 21/554 |
| 11,431,510 B1* | 8/2022 | Stapleton | H04L 9/3268 |
| 11,436,611 B2* | 9/2022 | Koch | H04W 4/029 |
| 11,444,968 B1* | 9/2022 | Wolpoff | H04L 63/1433 |
| 11,451,571 B2* | 9/2022 | Du | H04L 63/20 |
| 11,483,293 B1* | 10/2022 | Spain | G06F 21/57 |
| 11,483,339 B1* | 10/2022 | Kaimal | H04L 63/1416 |
| 11,503,049 B2* | 11/2022 | Duffy | H04L 43/08 |
| 11,509,654 B2* | 11/2022 | Schmidt | H04L 63/0884 |
| 11,510,061 B1* | 11/2022 | Lin | H04L 63/1458 |
| 11,533,314 B2* | 12/2022 | Badawy | H04L 63/107 |
| 11,533,315 B2* | 12/2022 | Brannon | H04L 63/1425 |
| 11,556,653 B1* | 1/2023 | Han | G06F 21/577 |
| 11,557,214 B2* | 1/2023 | Lawrenson | H04L 67/12 |
| 11,558,412 B1* | 1/2023 | Drake | G06F 3/0484 |
| 11,563,718 B2* | 1/2023 | Rodriguez | G16Y 30/10 |
| 11,575,703 B2* | 2/2023 | Reybok, Jr. | H04L 63/1433 |
| 11,586,766 B1* | 2/2023 | Stewart | G06F 16/285 |
| 11,587,422 B1* | 2/2023 | Wang | G08B 21/0208 |
| 11,611,532 B1* | 3/2023 | Haefner | H04L 63/1425 |
| 11,658,983 B2* | 5/2023 | Leibmann | G06F 21/33 726/4 |
| 11,664,992 B1* | 5/2023 | Adams | H04L 9/50 713/168 |
| 11,706,241 B1* | 7/2023 | Cross | H04L 63/1425 726/25 |
| 11,722,492 B1* | 8/2023 | Obaidi | H04L 63/145 726/13 |
| 11,727,520 B2* | 8/2023 | Burris | G10L 15/18 705/325 |
| 11,777,992 B1* | 10/2023 | Cross | H04L 63/0876 726/5 |
| 11,783,342 B1* | 10/2023 | Griffin | G06Q 50/18 705/44 |
| 11,784,833 B1* | 10/2023 | Willardson | H04L 9/3268 713/156 |
| 11,816,729 B1* | 11/2023 | Willardson | G06Q 40/03 |
| 11,822,673 B2* | 11/2023 | Araujo | H04L 63/1433 |
| 11,823,100 B1* | 11/2023 | Adams | G06Q 10/06 |
| 11,908,176 B2* | 2/2024 | Kim | G06F 18/214 |
| 11,997,103 B2* | 5/2024 | Bankston | G06F 21/6254 |
| 12,015,630 B1* | 6/2024 | Cross | H04L 63/1433 |
| 12,015,631 B2* | 6/2024 | Morgan | H04L 63/1433 |
| 12,184,702 B2* | 12/2024 | Raleigh | H04W 72/0453 |
| 12,288,271 B1* | 4/2025 | Labrecque | G06T 11/00 |
| 2007/0177615 A1* | 8/2007 | Miliefsky | H04L 63/1408 370/401 |
| 2015/0128205 A1* | 5/2015 | Mahaffey | H04L 63/105 726/1 |
| 2015/0134801 A1* | 5/2015 | Walley | H04L 43/50 709/223 |
| 2015/0134954 A1* | 5/2015 | Walley | H04L 63/0823 713/168 |
| 2015/0142968 A1* | 5/2015 | Bhagwat | H04L 67/51 709/224 |
| 2015/0249672 A1* | 9/2015 | Burns | G06F 21/629 726/4 |
| 2015/0295763 A1* | 10/2015 | Yu | H04L 63/02 726/4 |
| 2016/0099963 A1* | 4/2016 | Mahaffey | H04L 63/166 726/25 |
| 2016/0127390 A1* | 5/2016 | Lai | H04L 63/1416 726/23 |
| 2016/0128043 A1* | 5/2016 | Shuman | H04W 72/044 370/329 |
| 2016/0173447 A1* | 6/2016 | Achim | H04L 67/12 726/11 |
| 2016/0212099 A1* | 7/2016 | Zou | H04L 63/1425 |
| 2016/0226895 A1* | 8/2016 | Huang | G06F 21/552 |
| 2016/0239937 A1* | 8/2016 | Kim | G06T 1/20 |
| 2016/0241439 A1* | 8/2016 | Idnani | H04L 41/0816 |
| 2016/0261465 A1* | 9/2016 | Gupta | H04L 43/08 |
| 2016/0321125 A1* | 11/2016 | Kang | G06F 11/079 |
| 2016/0323257 A1* | 11/2016 | Kang | H04W 12/08 |
| 2016/0323283 A1* | 11/2016 | Kang | H04L 63/08 |
| 2016/0330182 A1* | 11/2016 | Jeon | A43B 3/34 |
| 2016/0337322 A1* | 11/2016 | Kang | H04L 67/12 |
| 2016/0359882 A1* | 12/2016 | Touboul | G06F 21/55 |
| 2016/0364163 A1* | 12/2016 | Kamble | H04L 63/105 |
| 2017/0048596 A1* | 2/2017 | Fonseca, Jr. | H04N 21/234 |
| 2017/0063915 A1* | 3/2017 | Shafigullin | G06F 21/577 |
| 2017/0063930 A1* | 3/2017 | Chesla | H04L 63/1425 |
| 2017/0093897 A1* | 3/2017 | Cochin | H04L 63/145 |
| 2017/0105131 A1* | 4/2017 | Song | H04W 4/80 |
| 2017/0105171 A1* | 4/2017 | Srivastava | H04L 67/63 |
| 2017/0109436 A1* | 4/2017 | DelSordo | H04L 41/0686 |
| 2017/0134418 A1* | 5/2017 | Minoli | H04L 63/1433 |
| 2017/0149802 A1* | 5/2017 | Huang | G06F 21/577 |
| 2017/0185276 A1* | 6/2017 | Lee | G06F 3/04847 |
| 2017/0208057 A1* | 7/2017 | Wang | H04L 63/083 |
| 2017/0214701 A1* | 7/2017 | Hasan | H04L 63/1433 |
| 2017/0214708 A1* | 7/2017 | Gukal | G06F 16/285 |
| 2017/0223046 A1* | 8/2017 | Singh | H04L 63/1491 |
| 2017/0244740 A1* | 8/2017 | Mahabir | H04L 63/1433 |
| 2017/0264644 A1* | 9/2017 | Mihan | H04L 63/1441 |
| 2017/0272940 A1* | 9/2017 | Ghosh | H04L 63/0227 |
| 2017/0289184 A1* | 10/2017 | C | H04L 63/1425 |
| 2017/0295197 A1* | 10/2017 | Parimi | G06N 20/00 |
| 2017/0329783 A1* | 11/2017 | Singh | H04L 63/1441 |
| 2017/0346824 A1* | 11/2017 | Mahabir | H04L 63/1433 |
| 2017/0346846 A1* | 11/2017 | Findlay | H04L 63/1433 |
| 2017/0374490 A1* | 12/2017 | Schoppmeier | H04L 67/12 |
| 2018/0004937 A1* | 1/2018 | Shannon | H04L 9/0891 |
| 2018/0005235 A1* | 1/2018 | Thorne | G06Q 20/3829 |
| 2018/0034921 A1* | 2/2018 | Gopalan | G06N 20/00 |
| 2018/0034922 A1* | 2/2018 | Gopalan | G06N 20/00 |
| 2018/0048534 A1* | 2/2018 | Banga | G06N 20/00 |
| 2018/0048668 A1* | 2/2018 | Gupta | H04L 63/1425 |
| 2018/0048669 A1* | 2/2018 | Lokamathe | G06N 5/04 |
| 2018/0082059 A1* | 3/2018 | Bender | H04L 63/1425 |
| 2018/0097775 A1* | 4/2018 | Obaidi | H04L 63/0236 |
| 2018/0098191 A1* | 4/2018 | Srinivasan | H04W 4/38 |

(56) References Cited

U.S. PATENT DOCUMENTS

| | | | | |
|---|---|---|---|---|
| 2018/0115611 A1* | | 4/2018 | Lear | H04L 41/28 |
| 2018/0121732 A1* | | 5/2018 | Kim | G06F 18/214 |
| 2018/0124094 A1* | | 5/2018 | Hamdi | G06F 7/24 |
| 2018/0124095 A1* | | 5/2018 | Hamdi | G06F 7/24 |
| 2018/0129939 A1* | | 5/2018 | Yang | G06N 3/04 |
| 2018/0144139 A1* | | 5/2018 | Cheng | H04L 63/1433 |
| 2018/0146002 A1* | | 5/2018 | Canfield | H04L 63/1433 |
| 2018/0159889 A1* | | 6/2018 | Sjouwerman | G06F 30/20 |
| 2018/0167467 A1* | | 6/2018 | Chen | H04L 41/22 |
| 2018/0176027 A1* | | 6/2018 | DelSordo | H04L 65/612 |
| 2018/0176625 A1* | | 6/2018 | Vossen | H04N 21/4882 |
| 2018/0183826 A1* | | 6/2018 | Demi | H04W 12/12 |
| 2018/0184464 A1* | | 6/2018 | Fang | H04L 67/12 |
| 2018/0189276 A1* | | 7/2018 | Fonseca, Jr. | H04N 21/812 |
| 2018/0191666 A1* | | 7/2018 | Rahman | H04L 61/4541 |
| 2018/0191738 A1* | | 7/2018 | David | H04L 63/105 |
| 2018/0191766 A1* | | 7/2018 | Holeman | H04L 63/20 |
| 2018/0241767 A1* | | 8/2018 | Crabtree | G06F 11/3495 |
| 2018/0255080 A1* | | 9/2018 | Paine | H04L 63/1466 |
| 2018/0270267 A1* | | 9/2018 | Ouellette | G06F 3/0481 |
| 2018/0276372 A1* | | 9/2018 | Crabtree | G06F 9/455 |
| 2018/0278553 A1* | | 9/2018 | Yu | G06Q 30/02 |
| 2018/0295148 A1* | | 10/2018 | Mayorgo | H04L 63/105 |
| 2018/0302409 A1* | | 10/2018 | Hope | G06F 21/6281 |
| 2018/0316705 A1* | | 11/2018 | Tsironis | H04L 41/145 |
| 2018/0316713 A1* | | 11/2018 | Tsironis | H04L 63/1425 |
| 2018/0321993 A1* | | 11/2018 | McClory | H04L 41/5041 |
| 2018/0337769 A1* | | 11/2018 | Gleichauf | G06F 21/645 |
| 2018/0337939 A1* | | 11/2018 | Agarwal | G06F 16/26 |
| 2018/0343132 A1* | | 11/2018 | Maheshwari | H04W 24/10 |
| 2018/0359244 A1* | | 12/2018 | Cockerill | H04L 63/105 |
| 2018/0375892 A1* | | 12/2018 | Ganor | G06Q 10/0635 |
| 2019/0007311 A1* | | 1/2019 | Omar | H04L 45/586 |
| 2019/0007447 A1* | | 1/2019 | Barnes | H04L 63/306 |
| 2019/0020683 A1* | | 1/2019 | Haerterich | H04L 63/1491 |
| 2019/0025801 A1* | | 1/2019 | Suzuki | G05B 19/4183 |
| 2019/0037378 A1* | | 1/2019 | Xia | H04L 63/0876 |
| 2019/0044813 A1* | | 2/2019 | Oksman | H04L 47/762 |
| 2019/0044949 A1* | | 2/2019 | Bartfai-Walcott | H04W 12/63 |
| 2019/0050596 A1* | | 2/2019 | Barday | H04L 63/1433 |
| 2019/0050766 A1* | | 2/2019 | Barday | H04W 12/02 |
| 2019/0057204 A1* | | 2/2019 | Marcovecchio | H04L 67/146 |
| 2019/0069123 A1* | | 2/2019 | Vincent | H04W 4/70 |
| 2019/0073627 A1* | | 3/2019 | Nakdimon | G06Q 10/087 |
| 2019/0080091 A1* | | 3/2019 | Kim | H04L 63/123 |
| 2019/0089725 A1* | | 3/2019 | Anachi | G06N 20/00 |
| 2019/0095640 A1* | | 3/2019 | Yu | H04L 63/123 |
| 2019/0098039 A1* | | 3/2019 | Gates | G16H 20/70 |
| 2019/0109872 A1* | | 4/2019 | Dhakshinamoorthy | G06F 21/577 |
| 2019/0114541 A1* | | 4/2019 | Yang | G06N 3/04 |
| 2019/0130114 A1* | | 5/2019 | Smith | G06F 21/10 |
| 2019/0132347 A1* | | 5/2019 | Wakid | H04L 63/1475 |
| 2019/0141562 A1* | | 5/2019 | Tyagi | H04W 8/005 |
| 2019/0147167 A1* | | 5/2019 | Kim | G06F 40/143 726/25 |
| 2019/0171822 A1* | | 6/2019 | Sjouwerman | H04L 63/1483 |
| 2019/0171984 A1* | | 6/2019 | Irimie | G06Q 10/0635 |
| 2019/0173913 A1* | | 6/2019 | Kras | H04L 63/1483 |
| 2019/0173914 A1* | | 6/2019 | Irimie | G06F 21/577 |
| 2019/0173915 A1* | | 6/2019 | Irimie | G06N 3/044 |
| 2019/0173916 A1* | | 6/2019 | Irimie | G06F 21/552 |
| 2019/0173917 A1* | | 6/2019 | Sites | G06N 3/082 |
| 2019/0173918 A1* | | 6/2019 | Sites | G06N 3/044 |
| 2019/0173919 A1* | | 6/2019 | Irimie | H04L 63/1483 |
| 2019/0190955 A1* | | 6/2019 | Khan | H04L 63/20 |
| 2019/0207981 A1* | | 7/2019 | Sweeney | H04L 41/145 |
| 2019/0215688 A1* | | 7/2019 | Zavesky | H04L 67/56 |
| 2019/0222594 A1* | | 7/2019 | Davis, III | G06N 5/025 |
| 2019/0238574 A1* | | 8/2019 | Iliofotou | H04L 63/08 |
| 2019/0238582 A1* | | 8/2019 | Sauve | H04L 63/1433 |
| 2019/0238584 A1* | | 8/2019 | Somasundaram | H04L 63/20 |
| 2019/0238591 A1* | | 8/2019 | Shaw | H04L 63/029 |
| 2019/0245894 A1* | | 8/2019 | Epple | H04L 63/1483 |
| 2019/0250898 A1* | | 8/2019 | Yang | H04W 12/08 |
| 2019/0260785 A1* | | 8/2019 | Jenkinson | H04L 41/22 |
| 2019/0268177 A1* | | 8/2019 | Li | G06N 20/00 |
| 2019/0268307 A1* | | 8/2019 | Lancioni | H04L 63/20 |
| 2019/0268376 A1* | | 8/2019 | Park | H04L 63/0428 |
| 2019/0272375 A1* | | 9/2019 | Chen | G06N 5/045 |
| 2019/0273746 A1* | | 9/2019 | Coffing | G06Q 20/40 |
| 2019/0306731 A1* | | 10/2019 | Raghuramu | H04L 63/1433 |
| 2019/0312905 A1* | | 10/2019 | Green | H04L 63/205 |
| 2019/0319728 A1* | | 10/2019 | Strobel | H04B 3/32 |
| 2019/0319987 A1* | | 10/2019 | Levy | H04L 63/08 |
| 2019/0327260 A1* | | 10/2019 | Adamson | H04L 43/065 |
| 2019/0334886 A1* | | 10/2019 | Lelcuk | H04L 9/50 |
| 2019/0369683 A1* | | 12/2019 | Vishnubhatla | G06F 1/3206 |
| 2019/0391800 A1* | | 12/2019 | Lin | G06F 8/65 |
| 2020/0007570 A1* | | 1/2020 | Lam | H04L 63/1433 |
| 2020/0012796 A1* | | 1/2020 | Trepagnier | G06F 18/254 |
| 2020/0014720 A1* | | 1/2020 | Giura | G06F 8/65 |
| 2020/0026997 A1* | | 1/2020 | Yang | G06F 9/5066 |
| 2020/0028874 A1* | | 1/2020 | Lam | H04L 63/145 |
| 2020/0034538 A1* | | 1/2020 | Woodward | G06F 12/0842 |
| 2020/0043008 A1* | | 2/2020 | Hrabik | G06Q 20/405 |
| 2020/0045045 A1* | | 2/2020 | Zheng | H04W 12/08 |
| 2020/0050761 A1* | | 2/2020 | Lancioni | G06F 21/566 |
| 2020/0053109 A1* | | 2/2020 | Lancioni | H04L 63/1425 |
| 2020/0053116 A1* | | 2/2020 | Soroush | H04L 43/065 |
| 2020/0059976 A1* | | 2/2020 | Bhatia | H04W 8/005 |
| 2020/0061699 A1* | | 2/2020 | Auer | B22D 19/00 |
| 2020/0067965 A1* | | 2/2020 | Dada | H04L 63/1433 |
| 2020/0074084 A1* | | 3/2020 | Dorrans | G06F 21/577 |
| 2020/0074285 A1* | | 3/2020 | Kim | G06F 7/4991 |
| 2020/0076835 A1* | | 3/2020 | Ladnai | H04L 63/0263 |
| 2020/0076896 A1* | | 3/2020 | Anumala | H04W 4/70 |
| 2020/0097653 A1* | | 3/2020 | Mehta | G06N 3/045 |
| 2020/0097662 A1* | | 3/2020 | Hufsmith | H04L 9/0643 |
| 2020/0106799 A1* | | 4/2020 | Sauve | H04L 63/1433 |
| 2020/0106801 A1* | | 4/2020 | Evans | H04L 63/1433 |
| 2020/0125734 A1* | | 4/2020 | Light | H04L 63/1433 |
| 2020/0128114 A1* | | 4/2020 | Kloberdans | H04L 69/16 |
| 2020/0142598 A1* | | 5/2020 | Liu | G06F 11/0793 |
| 2020/0153697 A1* | | 5/2020 | Turner | H04L 41/12 |
| 2020/0153846 A1* | | 5/2020 | Srivastava | H04L 63/20 |
| 2020/0169429 A1* | | 5/2020 | Suzuki | H04W 4/38 |
| 2020/0177445 A1* | | 6/2020 | Yamamoto | G06F 13/00 |
| 2020/0177589 A1* | | 6/2020 | Mangalvedkar | H04W 4/50 |
| 2020/0177613 A1* | | 6/2020 | Nilangekar | G06F 21/577 |
| 2020/0177618 A1* | | 6/2020 | Hassanzadeh | G06F 21/552 |
| 2020/0183761 A1* | | 6/2020 | Roy | H04L 63/145 |
| 2020/0184105 A1* | | 6/2020 | Nikain | G06F 21/6254 |
| 2020/0186853 A1* | | 6/2020 | Vastardis | H04N 21/6405 |
| 2020/0194008 A1* | | 6/2020 | Lee | G10L 17/22 |
| 2020/0195679 A1* | | 6/2020 | Du | H04L 63/1433 |
| 2020/0196027 A1* | | 6/2020 | Archer, III | H04N 21/84 |
| 2020/0201962 A1* | | 6/2020 | Brannon | G06F 11/3438 |
| 2020/0201963 A1* | | 6/2020 | Brannon | G06F 21/6245 |
| 2020/0202650 A1* | | 6/2020 | Moeller | H04L 9/0897 |
| 2020/0204673 A1* | | 6/2020 | Barathan | H04W 4/70 |
| 2020/0206675 A1* | | 7/2020 | Kim | B01D 53/04 |
| 2020/0210572 A1* | | 7/2020 | Devane | G06F 21/566 |
| 2020/0211506 A1* | | 7/2020 | Zavesky | G09G 5/12 |
| 2020/0213277 A1* | | 7/2020 | Rudnik | H04L 12/4641 |
| 2020/0219005 A1* | | 7/2020 | Valdez | G06N 20/20 |
| 2020/0220873 A1* | | 7/2020 | Adiga | H04L 63/10 |
| 2020/0220919 A1* | | 7/2020 | Di Girolamo | H04L 67/10 |
| 2020/0229206 A1* | | 7/2020 | Badic | G05D 1/225 |
| 2020/0236129 A1* | | 7/2020 | Barkovic | H04L 43/045 |
| 2020/0244691 A1* | | 7/2020 | Veeramany | H04L 63/0236 |
| 2020/0252422 A1* | | 8/2020 | Davis | H04L 63/102 |
| 2020/0259779 A1* | | 8/2020 | Liu | H04L 51/10 |
| 2020/0267004 A1* | | 8/2020 | Lounsberry | H04L 9/3265 |
| 2020/0267146 A1* | | 8/2020 | Nambiar | G06N 20/00 |
| 2020/0272972 A1* | | 8/2020 | Harry | G06Q 10/0635 |
| 2020/0274868 A1* | | 8/2020 | Passaglia | H04L 63/083 |
| 2020/0274894 A1* | | 8/2020 | Argoeti | H04L 63/1433 |
| 2020/0280568 A1* | | 9/2020 | Bratspiess | H04L 63/1433 |
| 2020/0296137 A1* | | 9/2020 | Crabtree | H04L 63/1433 |
| 2020/0296139 A1* | | 9/2020 | Fainberg | H04L 63/205 |
| 2020/0304318 A1* | | 9/2020 | Kravitz | H04L 9/3268 |
| 2020/0304377 A1* | | 9/2020 | Subramaniam | H04L 41/122 |
| 2020/0304459 A1* | | 9/2020 | Konda, Jr. | H04L 63/126 |

(56) References Cited

U.S. PATENT DOCUMENTS

| | | |
|---|---|---|
| 2020/0304536 A1* | 9/2020 | Mahabir .............. H04L 63/1475 |
| 2020/0310709 A1* | 10/2020 | Suraparaju ............ G06F 16/275 |
| 2020/0311259 A1* | 10/2020 | Schmugar ............ G06F 21/554 |
| 2020/0313929 A1* | 10/2020 | Rudnik ............... H04L 61/4511 |
| 2020/0314067 A1* | 10/2020 | Rudnik ............... H04L 63/0272 |
| 2020/0314126 A1* | 10/2020 | Schmugar ............ H04W 12/12 |
| 2020/0320226 A1* | 10/2020 | Chitrak Gupta .... G06F 21/6218 |
| 2020/0322137 A1* | 10/2020 | Arumugam ............ H04L 9/50 |
| 2020/0322368 A1* | 10/2020 | Cohen ..................... G06F 18/23 |
| 2020/0322369 A1* | 10/2020 | Raghuramu ........... H04L 63/102 |
| 2020/0327222 A1* | 10/2020 | Chhabra ............. H04L 63/0421 |
| 2020/0336508 A1* | 10/2020 | Srivastava .............. H04L 63/20 |
| 2020/0344040 A1* | 10/2020 | Abdolee ............... H04L 9/0668 |
| 2020/0351261 A1* | 11/2020 | Milton ................. H04L 63/0823 |
| 2020/0351298 A1* | 11/2020 | Paturi ..................... G06F 21/54 |
| 2020/0356676 A1* | 11/2020 | Gorlamandala ...... G06F 21/577 |
| 2020/0356678 A1* | 11/2020 | Gourisetti ............. G06F 21/577 |
| 2020/0358802 A1* | 11/2020 | Viswambharan ..... G06F 9/5072 |
| 2020/0358820 A1* | 11/2020 | Kolingivadi ........ H04L 63/1433 |
| 2020/0366704 A1* | 11/2020 | Vasudevan ........... H04L 63/1433 |
| 2020/0372154 A1* | 11/2020 | Bacher ................ H04L 63/1408 |
| 2020/0374147 A1* | 11/2020 | Ogawa ................. H04W 88/06 |
| 2020/0374316 A1* | 11/2020 | Crabtree ............. H04L 63/1441 |
| 2020/0374319 A1* | 11/2020 | Yakovlev ........... H04L 63/1425 |
| 2020/0380160 A1* | 12/2020 | Kraus ................... G06F 21/577 |
| 2020/0382547 A1* | 12/2020 | Basballe Sorensen ...................... H04L 63/1433 |
| 2020/0387617 A1* | 12/2020 | Zimmermann ...... G06F 21/6209 |
| 2020/0387973 A1* | 12/2020 | Blankinship ......... G06Q 20/204 |
| 2020/0389480 A1* | 12/2020 | Nunes ................... H04L 67/02 |
| 2020/0389869 A1* | 12/2020 | Patil ..................... H04B 17/318 |
| 2020/0389938 A1* | 12/2020 | Ogawa ................ H04L 12/2834 |
| 2020/0396211 A1* | 12/2020 | Dobbins .............. G06F 21/52 |
| 2020/0396221 A1* | 12/2020 | Shaffer ............... H04L 63/0876 |
| 2020/0396241 A1* | 12/2020 | Crabtree ............. H04L 63/1433 |
| 2020/0396254 A1* | 12/2020 | Crabtree .............. H04L 63/20 |
| 2020/0398062 A1* | 12/2020 | Ibarrola ............... A61N 1/37254 |
| 2020/0401700 A1* | 12/2020 | Moran ..................... G06F 8/65 |
| 2020/0403991 A1* | 12/2020 | Sohail .................. H04L 63/1433 |
| 2020/0404024 A1* | 12/2020 | Waplington ............ H04L 67/51 |
| 2020/0412570 A1* | 12/2020 | Takeda ................ H04L 12/2816 |
| 2020/0412728 A1* | 12/2020 | Gupta ................. H04L 63/1416 |
| 2020/0412758 A1* | 12/2020 | Trivellato ............. G06F 21/577 |
| 2021/0004663 A1* | 1/2021 | Park ........................ G06N 3/047 |
| 2021/0006584 A1* | 1/2021 | Basballe Sorensen ...................... G06Q 10/105 |
| 2021/0014263 A1* | 1/2021 | Soroush .................. G06F 21/57 |
| 2021/0014314 A1* | 1/2021 | Yamada ................. H04L 67/52 |
| 2021/0021636 A1* | 1/2021 | Sbandi ................ H04L 63/1466 |
| 2021/0026945 A1* | 1/2021 | Huet ....................... H04L 63/08 |
| 2021/0029169 A1* | 1/2021 | Bouvet ................ H04W 12/088 |
| 2021/0029171 A1* | 1/2021 | Barday .............. H04L 63/0414 |
| 2021/0035116 A1* | 2/2021 | Berrington ............... G06N 5/04 |
| 2021/0037050 A1* | 2/2021 | Ree ...................... H04L 63/1416 |
| 2021/0051028 A1* | 2/2021 | Kapon ..................... H04L 63/20 |
| 2021/0058391 A1* | 2/2021 | Graybeal ............. H04W 12/086 |
| 2021/0058396 A1* | 2/2021 | Nathanson .............. H04W 4/44 |
| 2021/0058412 A1* | 2/2021 | Rowland ................ G06F 21/56 |
| 2021/0058415 A1* | 2/2021 | Sanzgiri ................. G06N 20/00 |
| 2021/0075814 A1* | 3/2021 | Bulut ..................... H04L 63/20 |
| 2021/0076319 A1* | 3/2021 | Yoshikawa ............ H04W 40/02 |
| 2021/0091579 A1* | 3/2021 | Chai ...................... H05K 1/18 |
| 2021/0092116 A1* | 3/2021 | Zimmermann ..... H04L 63/0823 |
| 2021/0092161 A1* | 3/2021 | Crabtree .............. H04L 63/1433 |
| 2021/0098005 A1* | 4/2021 | Le Razavet ........... G10L 19/008 |
| 2021/0099481 A1* | 4/2021 | Mallis .................. H04L 63/02 |
| 2021/0099493 A1* | 4/2021 | Sun ..................... H04L 63/1408 |
| 2021/0099874 A1* | 4/2021 | Suraparaju ............ H04W 12/03 |
| 2021/0105869 A1* | 4/2021 | Mo ....................... G06Q 30/08 |
| 2021/0110440 A1* | 4/2021 | Dion .................... G06Q 30/018 |
| 2021/0112075 A1* | 4/2021 | Cunningham ........ G06F 21/566 |
| 2021/0136088 A1* | 5/2021 | Verma ................. H04L 63/101 |
| 2021/0136163 A1* | 5/2021 | McCormick .......... H04L 67/146 |
| 2021/0144162 A1* | 5/2021 | Sloane ................ H04L 63/1458 |
| 2021/0144163 A1* | 5/2021 | Sloane ................ H04L 63/102 |
| 2021/0152588 A1* | 5/2021 | Cruz ...................... G06F 8/658 |
| 2021/0152590 A1* | 5/2021 | Urias .................. H04L 63/1425 |
| 2021/0153270 A1* | 5/2021 | Wang .................... H04W 76/11 |
| 2021/0160314 A1* | 5/2021 | Parvataneni ........... H04L 9/3239 |
| 2021/0168165 A1* | 6/2021 | Alsaeed ................. G06N 20/00 |
| 2021/0192210 A1* | 6/2021 | De Andrade ........ G06V 10/764 |
| 2021/0194911 A1* | 6/2021 | Hecht .................. H04L 63/1433 |
| 2021/0194913 A1* | 6/2021 | Hecht .................. H04L 63/105 |
| 2021/0194924 A1* | 6/2021 | Heinemeyer ............ G06N 5/04 |
| 2021/0200881 A1* | 7/2021 | Joshi ..................... G06F 21/6218 |
| 2021/0203521 A1* | 7/2021 | Konda ................ H04L 63/1425 |
| 2021/0203673 A1* | 7/2021 | dos Santos ......... H04L 63/1408 |
| 2021/0203687 A1* | 7/2021 | Rabin .................. H04L 63/105 |
| 2021/0211450 A1* | 7/2021 | Aleidan ............... H04L 63/1416 |
| 2021/0211451 A1* | 7/2021 | Alsharif ................ H04L 63/12 |
| 2021/0211452 A1* | 7/2021 | Patel .................... H04L 63/1416 |
| 2021/0216306 A1* | 7/2021 | Moeller ................. G06F 8/656 |
| 2021/0226827 A1* | 7/2021 | Oksman ............ H04L 25/03159 |
| 2021/0226983 A1* | 7/2021 | Cunningham ........ H04L 63/102 |
| 2021/0232593 A1* | 7/2021 | Hamdi .................. H04L 43/20 |
| 2021/0234848 A1* | 7/2021 | Harris .................. H04W 12/06 |
| 2021/0234875 A1* | 7/2021 | Hecht .................. H04L 63/1416 |
| 2021/0240462 A1* | 8/2021 | de Jong ................ G06F 11/368 |
| 2021/0243209 A1* | 8/2021 | Ramani ................... H04L 63/20 |
| 2021/0243219 A1* | 8/2021 | Kawakita ............... G06F 21/55 |
| 2021/0248615 A1* | 8/2021 | Shukla .................. G06N 3/08 |
| 2021/0250342 A1* | 8/2021 | Budman ................ G06N 7/01 |
| 2021/0250422 A1* | 8/2021 | Mladin .................. H04L 67/62 |
| 2021/0256861 A1* | 8/2021 | Hollander ............. G06Q 50/20 |
| 2021/0258791 A1* | 8/2021 | Jochem ................ H04W 12/66 |
| 2021/0264035 A1* | 8/2021 | Gitelman ................. G06N 5/04 |
| 2021/0266185 A1* | 8/2021 | Konda ................ H04L 61/4511 |
| 2021/0266326 A1* | 8/2021 | Chen ...................... H04L 67/52 |
| 2021/0266340 A1* | 8/2021 | Grounds ............ H04L 63/1433 |
| 2021/0273958 A1* | 9/2021 | McLean ............ H04L 63/1433 |
| 2021/0273961 A1* | 9/2021 | Humphrey ......... H04L 63/1425 |
| 2021/0273967 A1* | 9/2021 | Vela .................... H04L 63/1466 |
| 2021/0294317 A1* | 9/2021 | Sharma ................. G05B 15/02 |
| 2021/0294901 A1* | 9/2021 | Agarwwal ........... H04L 41/145 |
| 2021/0297441 A1* | 9/2021 | Olalere .................. H04L 63/1408 |
| 2021/0303268 A1* | 9/2021 | Sloss ..................... G06F 7/584 |
| 2021/0303764 A1* | 9/2021 | Sloss ..................... G06F 21/64 |
| 2021/0306416 A1* | 9/2021 | Mukhopadhyay ......................... H04L 41/5051 |
| 2021/0312400 A1* | 10/2021 | Irimie ................ H04L 63/1416 |
| 2021/0313078 A1* | 10/2021 | Chiappetta ............ G06F 21/572 |
| 2021/0314329 A1* | 10/2021 | Joshi .................... H04L 63/108 |
| 2021/0314338 A1* | 10/2021 | Howe ................... H04L 63/1408 |
| 2021/0326452 A1* | 10/2021 | Diehl ..................... G06F 21/60 |
| 2021/0329023 A1* | 10/2021 | Mohammad ............. G06N 7/01 |
| 2021/0329024 A1* | 10/2021 | Mauro .................. G06F 21/577 |
| 2021/0336981 A1* | 10/2021 | Akella ..................... G06N 7/00 |
| 2021/0336982 A1* | 10/2021 | Akella ................ H04L 63/1425 |
| 2021/0336996 A1* | 10/2021 | Brannon ............... G06F 21/577 |
| 2021/0344693 A1* | 11/2021 | Azad .................... G06F 21/566 |
| 2021/0344720 A1* | 11/2021 | Barday .................. H04L 63/04 |
| 2021/0352099 A1* | 11/2021 | Rogers ................... H04L 63/20 |
| 2021/0360032 A1* | 11/2021 | Crabtree ............. H04L 63/1441 |
| 2021/0367842 A1* | 11/2021 | Le Guillou ......... H04L 41/0886 |
| 2021/0367961 A1* | 11/2021 | Kuppa ................. G06F 40/205 |
| 2021/0377284 A1* | 12/2021 | Soryal ..................... G06F 8/62 |
| 2021/0377735 A1* | 12/2021 | Latour ................. H04W 12/069 |
| 2021/0382704 A1* | 12/2021 | Rainbird ............. G06F 21/572 |
| 2021/0382743 A1* | 12/2021 | Kaufman ............ G06F 9/44505 |
| 2021/0392170 A1* | 12/2021 | Kakinada ............. H04L 47/781 |
| 2021/0392171 A1* | 12/2021 | Srinivas ................. G06N 5/047 |
| 2021/0400071 A1* | 12/2021 | Ray ....................... G06F 21/567 |
| 2021/0400074 A1* | 12/2021 | Smith .................. H04L 63/1408 |
| 2021/0400489 A1* | 12/2021 | Starsinic ................. H04W 60/04 |
| 2021/0406255 A1* | 12/2021 | Raghuramu ............. H04L 43/08 |
| 2021/0406274 A1* | 12/2021 | Lei ...................... H04L 67/1095 |
| 2021/0406720 A1* | 12/2021 | Song .................... H04L 63/0227 |
| 2021/0409449 A1* | 12/2021 | Crabtree ............. H04L 63/1408 |
| 2022/0004645 A1* | 1/2022 | Agarwwal ........... H04L 41/145 |
| 2022/0006746 A1* | 1/2022 | Martin ................... G16H 40/67 |
| 2022/0006791 A1* | 1/2022 | Alshahrani ............ H04L 63/105 |
| 2022/0006818 A1* | 1/2022 | Cunningham ........... H04L 63/14 |
| 2022/0006899 A1* | 1/2022 | Phatak ............... G06Q 20/4016 |
| 2022/0014560 A1* | 1/2022 | Crabtree ............. H04L 63/1433 |

(56) References Cited

U.S. PATENT DOCUMENTS

| | | |
|---|---|---|
| 2022/0014561 A1* | 1/2022 | Caceres .............. H04L 63/1425 |
| 2022/0021654 A1* | 1/2022 | Trentini .............. H04L 63/0272 |
| 2022/0027479 A1* | 1/2022 | Brannon ................ H04L 63/20 |
| 2022/0029794 A1* | 1/2022 | Malhotra .............. H04L 9/3242 |
| 2022/0035927 A1* | 2/2022 | Lysecky ............... G06F 21/566 |
| 2022/0036389 A1* | 2/2022 | Brannon ............. G06F 21/6245 |
| 2022/0038902 A1* | 2/2022 | Mueck ............... H04W 52/367 |
| 2022/0046032 A1* | 2/2022 | Le .......................... G06N 3/08 |
| 2022/0046059 A1* | 2/2022 | Pandurangi ............ H04L 63/20 |
| 2022/0053047 A1* | 2/2022 | Lenrow ................ H04L 67/133 |
| 2022/0060474 A1* | 2/2022 | Trentini .............. H04L 63/0236 |
| 2022/0060498 A1* | 2/2022 | Head, Jr. ............ H04L 12/4641 |
| 2022/0060507 A1* | 2/2022 | Crabtree ............... H04L 67/14 |
| 2022/0060509 A1* | 2/2022 | Crabtree .............. H04L 63/1433 |
| 2022/0060512 A1* | 2/2022 | Crabtree ............... G06F 16/951 |
| 2022/0066433 A1* | 3/2022 | Xiang .................... G01B 3/18 |
| 2022/0070179 A1* | 3/2022 | Sohn .................. H04L 63/1425 |
| 2022/0070279 A1* | 3/2022 | Pang ................... H04L 67/133 |
| 2022/0075354 A1* | 3/2022 | Nixon ............... G05B 19/41835 |
| 2022/0077894 A1* | 3/2022 | Park ....................... H02J 50/60 |
| 2022/0078238 A1* | 3/2022 | Nixon ................. H04L 63/0876 |
| 2022/0086252 A1* | 3/2022 | Chen .................. H04L 67/567 |
| 2022/0092495 A1* | 3/2022 | Brannon ............. G06F 21/6245 |
| 2022/0100182 A1* | 3/2022 | Mehrotra ......... G05B 19/41885 |
| 2022/0103066 A1* | 3/2022 | Chen ....................... H02M 3/04 |
| 2022/0103586 A1* | 3/2022 | Shao .................... G06F 18/211 |
| 2022/0103588 A1* | 3/2022 | Shaw .................... H04W 72/51 |
| 2022/0103592 A1* | 3/2022 | Semel ................... H04L 63/20 |
| 2022/0103596 A1* | 3/2022 | Shaw .................. G06Q 20/325 |
| 2022/0104017 A1* | 3/2022 | Konda ................ H04W 12/086 |
| 2022/0116455 A1* | 4/2022 | Raghunath ........... G06F 1/3228 |
| 2022/0116783 A1* | 4/2022 | Goel .................... H04W 64/00 |
| 2022/0129990 A1* | 4/2022 | Roudaut .............. H04L 63/1433 |
| 2022/0156369 A1* | 5/2022 | Narayanaswamy .. H04L 9/0872 713/168 |
| 2022/0159059 A1* | 5/2022 | Abhigyan ............... H04L 67/51 |
| 2022/0164475 A1* | 5/2022 | Barday ............... H04L 63/1433 |
| 2022/0165035 A1* | 5/2022 | Cui ....................... G06T 3/4092 |
| 2022/0167035 A1* | 5/2022 | Beattie, Jr. .......... H04N 21/2347 |
| 2022/0172208 A1* | 6/2022 | Cella ..................... G06N 3/006 |
| 2022/0182278 A1* | 6/2022 | Vangapalli ........... H04L 41/0631 |
| 2022/0182379 A1* | 6/2022 | Budman ............... H04L 63/107 |
| 2022/0188425 A1* | 6/2022 | Wyatt .................. G06F 21/554 |
| 2022/0191009 A1* | 6/2022 | Losacco ............... H04L 9/0891 |
| 2022/0191233 A1* | 6/2022 | Kras .................. G06F 21/6245 |
| 2022/0191240 A1* | 6/2022 | Wolosewicz ........ H04L 63/1441 |
| 2022/0191244 A1* | 6/2022 | Komarek ............ H04L 63/1466 |
| 2022/0197247 A1* | 6/2022 | Cella ..................... G06N 5/025 |
| 2022/0201004 A1* | 6/2022 | Malton ................. H04L 63/105 |
| 2022/0201021 A1* | 6/2022 | Joshi .................. H04L 63/1425 |
| 2022/0201031 A1* | 6/2022 | Choudha ............. H04L 63/1425 |
| 2022/0210043 A1* | 6/2022 | Groot .................... H04L 43/20 |
| 2022/0210141 A1* | 6/2022 | Parekh ................... H04L 63/08 |
| 2022/0210196 A1* | 6/2022 | Parekh ................. H04L 63/0227 |
| 2022/0217173 A1* | 7/2022 | Cavallaro Corti .... G06F 40/205 |
| 2022/0224702 A1* | 7/2022 | Dherange ........... H04L 63/1433 |
| 2022/0224723 A1* | 7/2022 | Crabtree ............... H04L 63/20 |
| 2022/0225101 A1* | 7/2022 | Fellows .............. H04L 63/1416 |
| 2022/0232042 A1* | 7/2022 | Crabtree ............... G06F 16/951 |
| 2022/0235955 A1* | 7/2022 | Park ....................... F24F 11/52 |
| 2022/0237692 A1* | 7/2022 | Ratan ................... G06N 20/00 |
| 2022/0239696 A1* | 7/2022 | Konda ................ H04L 61/4511 |
| 2022/0247774 A1* | 8/2022 | Bigbee ................ G06F 16/9024 |
| 2022/0263850 A1* | 8/2022 | Colyandro, Jr. .... H04L 63/1433 |
| 2022/0263852 A1* | 8/2022 | Crabtree ................ G06N 5/045 |
| 2022/0272116 A1* | 8/2022 | Li ........................ G16Y 10/75 |
| 2022/0272607 A1* | 8/2022 | Yu ........................ H04W 8/186 |
| 2022/0277650 A1* | 9/2022 | Mondello ........ G08G 1/096725 |
| 2022/0286474 A1* | 9/2022 | Kuppa ................. H04L 63/145 |
| 2022/0292199 A1* | 9/2022 | Mosko ............... H04L 63/1433 |
| 2022/0294639 A1* | 9/2022 | Amsalem .............. H04L 67/535 |
| 2022/0294643 A1* | 9/2022 | Wang ..................... G06F 21/57 |
| 2022/0294817 A1* | 9/2022 | Parekh ................... H04L 67/10 |
| 2022/0294818 A1* | 9/2022 | Parekh ................ G06F 21/602 |
| 2022/0303282 A1* | 9/2022 | Barriga ................ H04L 63/0281 |
| 2022/0318800 A1* | 10/2022 | Levionnais ............. H04W 4/80 |
| 2022/0321362 A1* | 10/2022 | Konda .................. H04L 9/0891 |
| 2022/0321528 A1* | 10/2022 | Konda ................ H04L 61/4511 |
| 2022/0321532 A1* | 10/2022 | Du .......................... G16Y 30/10 |
| 2022/0329442 A1* | 10/2022 | Bulusu ................ H04L 63/1416 |
| 2022/0329630 A1* | 10/2022 | Li ........................... G06F 21/577 |
| 2022/0335440 A1* | 10/2022 | Brazao ............... G06F 16/90335 |
| 2022/0337622 A1* | 10/2022 | Bu ...................... H04L 63/1416 |
| 2022/0350630 A1* | 11/2022 | Parry-Barwick ... G06F 9/45558 |
| 2022/0353001 A1* | 11/2022 | Hu ...................... H04L 25/4908 |
| 2022/0353153 A1* | 11/2022 | Costante ............. H04L 63/1433 |
| 2022/0374709 A1* | 11/2022 | Kim ..................... G06N 3/0464 |
| 2022/0374710 A1* | 11/2022 | Kim ...................... G06N 3/045 |
| 2022/0374993 A1* | 11/2022 | Kim ....................... G06Q 40/08 |
| 2022/0385683 A1* | 12/2022 | Jones ................... H04L 63/1441 |
| 2022/0398636 A1* | 12/2022 | Fikes ..................... G06Q 20/02 |
| 2022/0400131 A1* | 12/2022 | Shao ..................... G06N 3/0455 |
| 2022/0416663 A1* | 12/2022 | Giuliano ............ H01L 23/49575 |
| 2022/0417038 A1* | 12/2022 | Kravitz ................... H04L 63/10 |
| 2023/0006467 A1* | 1/2023 | Fan ......................... H02J 50/001 |
| 2023/0007483 A1* | 1/2023 | Mueck ................. G06Q 50/265 |
| 2023/0011533 A1* | 1/2023 | Levionnais .......... H04B 13/005 |
| 2023/0018096 A1* | 1/2023 | Ueda .................... H04L 63/145 |
| 2023/0035522 A1* | 2/2023 | Nadgowda ............ G06F 21/577 |
| 2023/0038058 A1* | 2/2023 | May .................... H04L 63/0823 |
| 2023/0042613 A1* | 2/2023 | Kotaru .......... H04N 21/234309 |
| 2023/0056432 A1* | 2/2023 | Wu ...................... H04W 12/069 |
| 2023/0089194 A1* | 3/2023 | Carullo ................. G06F 21/577 726/25 |
| 2023/0100864 A1* | 3/2023 | Fischer ................... G06F 21/64 707/783 |
| 2023/0107178 A1* | 4/2023 | Youn ....................... H02J 50/80 307/104 |
| 2023/0111177 A1* | 4/2023 | Noel ........................ G06N 5/02 726/23 |
| 2023/0123735 A1* | 4/2023 | Major ................... G16H 20/30 705/2 |
| 2023/0123781 A1* | 4/2023 | Kaimal ................ G06F 9/5077 726/12 |
| 2023/0129776 A1* | 4/2023 | Agarwal ............... H04L 63/102 726/3 |
| 2023/0138971 A1* | 5/2023 | Krishnan .............. G06F 16/211 707/797 |
| 2023/0139000 A1* | 5/2023 | Apger .................... G06F 3/0482 726/1 |
| 2023/0163630 A1* | 5/2023 | Savanth ................. H02J 50/001 307/149 |
| 2023/0171280 A1* | 6/2023 | Bansal ................. H04L 63/0815 726/25 |
| 2023/0177167 A1* | 6/2023 | Chan .................... H04L 63/1433 726/1 |
| 2023/0188540 A1* | 6/2023 | Valluri ................... H04L 63/145 726/22 |
| 2023/0198966 A1* | 6/2023 | Opushnyev ........ G06Q 30/0641 |
| 2023/0208848 A1* | 6/2023 | Fainberg .............. H04L 63/101 726/3 |
| 2023/0216863 A1* | 7/2023 | Visen .................... H04L 9/3263 726/4 |
| 2023/0230064 A1* | 7/2023 | Garrett ................ G06Q 20/3276 705/17 |
| 2023/0247048 A1* | 8/2023 | Samosseiko ........ H04L 63/1425 726/23 |
| 2023/0252440 A1* | 8/2023 | Bedier .................. G06Q 20/209 705/16 |
| 2023/0252809 A1* | 8/2023 | Fadzeyeu ............... G06V 30/41 382/103 |
| 2023/0259935 A1* | 8/2023 | Mantoni ............... G06Q 20/401 705/44 |
| 2023/0260002 A1* | 8/2023 | Ghilani ................ G06Q 30/0627 705/26.63 |
| 2023/0275780 A1* | 8/2023 | Kim ...................... H04L 63/0272 709/224 |
| 2023/0283499 A1* | 9/2023 | Li ............................. H04L 67/30 |
| 2023/0283523 A1* | 9/2023 | Singh ................... H04L 43/0876 709/223 |
| 2023/0289748 A1* | 9/2023 | Pasciuto ................. H04W 4/025 |
| 2023/0291734 A1* | 9/2023 | Zimmermann ..... H04L 63/0823 |

(56) References Cited

U.S. PATENT DOCUMENTS

| | | | |
|---|---|---|---|
| 2023/0308467 A1* | 9/2023 | Koral | H04L 63/105 |
| 2023/0328094 A1* | 10/2023 | Brown | H04L 63/1433 726/23 |
| 2023/0336576 A1* | 10/2023 | Suzuki | H04L 43/0817 |
| 2023/0336585 A1* | 10/2023 | Koral | H04L 63/1458 |
| 2023/0344862 A1* | 10/2023 | Koral | H04L 63/1458 |
| 2023/0344917 A1* | 10/2023 | Chanak | H04L 67/02 |
| 2023/0359667 A1* | 11/2023 | Zionts | G06F 16/9024 |
| 2023/0360431 A1* | 11/2023 | Kuo | G06V 40/168 |
| 2023/0379404 A1* | 11/2023 | Nakamura | G16Y 40/35 |
| 2023/0403272 A1* | 12/2023 | Cheethirala | H04L 63/0823 |
| 2023/0403737 A1* | 12/2023 | Mohammad Soleymani | H04W 76/14 |
| 2023/0422039 A1* | 12/2023 | Saha | G06N 20/20 |
| 2024/0005315 A1* | 1/2024 | Agunloye | G06Q 20/381 |
| 2024/0007354 A1* | 1/2024 | Zoualfaghari | H04L 41/0895 |
| 2024/0007498 A1* | 1/2024 | Kim | H04L 63/00 |
| 2024/0012717 A1* | 1/2024 | Mitkar | G06F 11/1448 |
| 2024/0013564 A1* | 1/2024 | Kim | G06N 3/0455 |
| 2024/0019823 A1* | 1/2024 | Capoccia | H04L 63/0272 |
| 2024/0028235 A1* | 1/2024 | Sadiq | G06F 3/0604 |
| 2024/0028951 A1* | 1/2024 | Willardson | G06F 18/27 |
| 2024/0028986 A1* | 1/2024 | Willardson | G06Q 10/063112 |
| 2024/0029196 A1* | 1/2024 | Barragán del Rey | G06V 10/806 |
| 2024/0029420 A1* | 1/2024 | O'Neil | G06V 10/82 |
| 2024/0029546 A1* | 1/2024 | Lopareva | G01S 7/415 |
| 2024/0037713 A1* | 2/2024 | O'Neil | G06T 3/18 |
| 2024/0046065 A1* | 2/2024 | Tann | G06N 3/04 |
| 2024/0055084 A1* | 2/2024 | Arnold | G16H 40/20 |
| 2024/0064849 A1* | 2/2024 | Mohammad Soleymani | H04W 76/28 |
| 2024/0080198 A1* | 3/2024 | Willardson | H04L 9/3247 |
| 2024/0095385 A1* | 3/2024 | Dhouib | G06F 21/6254 |
| 2024/0097992 A1* | 3/2024 | Ganti | H04L 41/0866 |
| 2024/0104651 A1* | 3/2024 | Raleigh | G06Q 40/03 |
| 2024/0134713 A1* | 4/2024 | Jayaraman | G06F 9/5005 |
| 2024/0134714 A1* | 4/2024 | Jayaraman | G06F 9/5005 |
| 2024/0193612 A1* | 6/2024 | Roberts | G06N 3/08 |
| 2024/0259862 A1* | 8/2024 | Harounabadi | H04W 76/23 |
| 2024/0259913 A1* | 8/2024 | Haustein | H04W 76/15 |
| 2024/0281780 A1* | 8/2024 | Richter | G06N 20/00 |
| 2024/0312284 A1* | 9/2024 | Dion | G06Q 20/18 |
| 2024/0328644 A1* | 10/2024 | Latham | G01N 15/14 |
| 2024/0366953 A1* | 11/2024 | Beyer | G16H 40/63 |
| 2024/0371510 A1* | 11/2024 | Aman | G16H 40/63 |
| 2024/0388606 A1* | 11/2024 | Mihajlovic | H04L 9/40 |
| 2024/0406011 A1* | 12/2024 | Qiu | H04L 9/3265 |
| 2024/0420057 A1* | 12/2024 | Arumugam | G06Q 10/0637 |
| 2024/0422161 A1* | 12/2024 | Attarwala | H04L 63/0815 |
| 2024/0429739 A1* | 12/2024 | Dixon | H02J 13/00001 |
| 2025/0045805 A1* | 2/2025 | Dion | G06Q 30/0278 |
| 2025/0056322 A1* | 2/2025 | Manthiramoorthy | H04W 28/0925 |
| 2025/0085996 A1* | 3/2025 | Suman | G06F 21/602 |
| 2025/0099177 A1* | 3/2025 | Khan | A61B 18/20 |
| 2025/0103417 A1* | 3/2025 | Paulraj | G06F 11/0772 |
| 2025/0133073 A1* | 4/2025 | Chilamakuri | G06F 16/906 |
| 2025/0141747 A1* | 5/2025 | Zhu | H04L 41/0869 |

OTHER PUBLICATIONS

Neshenko et al "Demystifying IoT Security: An Exhaustive Survey on IoT Vulnerabilities and a First Empericial Look on Internet-Scale IoT Exploitations," IEEE Communications Surveys & Tutorials, vol. 21, No. 3, Third Quarter, pp. 2702-2733 (Year : 2019).*

Yadav et al "Assessment of SCADA System Vulnerabilities," IEEE, pp. 1737-1744 (Year: 2019).*

Alenezi et al "Machine Learning Approach to Predict Computer Operating Systems Vulnerabilties," IEEE, pp. 1-6, (Year: 2020).*

Bettayeb et al "IoT Testbed Security: Smart Socket and Smart Thermostat," 2019 IEEE Conference on Application, Information and Network Security (AINS), pp. 18-23 (Year: 2019).*

Visoottiviseth et al "A Mobile Application of Security Assessment Towards the Internet of Thing Devices," 2019 IEEE 6th Asian Conference on Defence Technology (ACDT), pp. 1-7 (Year: 2019).*

Aloul et al."A Monitoring and Control Gateway for IoT Edge Devices in Smart Home," IEEE, pp. 696-701 (Year: 2020).*

Sharma et al "Multiple Degree Authentication in Sensible Homes based on IoT Device Vulnerability," IEEE, pp. 539-543 (Year: 2020).*

Patton et al "Uninvited Connections: A Study of Vulnerable Devices on the Internet of Things (IoT)," IEEE Computer Society, pp. 232-235 (Year: 2014).*

* cited by examiner

HOME GATEWAY MONITORING FOR VULNERABLE HOME INTERNET OF THINGS DEVICES

BACKGROUND

Home Internet of Things ("IoT") devices are one of the hottest technology trends in recent years and are expected to grow in variety and number in the foreseeable future. Unfortunately, many IoT devices are designed with a focus on low cost to the detriment of security, with up to an estimated 80% of IoT devices being vulnerable to a wide range of attacks and threats. As a result, consumers may unknowingly introduce poorly designed and insecure IoT devices into their home WI-FI network.

Home IoT devices have become a primary vehicle for attackers to infiltrate home networks and abuse their resources. Many IoT devices run an outdated operating system, have unprotected interfaces, or have other vulnerabilities. Some IoT devices are tempered by the manufacturer with a backdoor that allows the manufacturer to access and potentially abuse the IoT devices after deployment. Other problems occur due to poor configuration of the IoT devices such as setting a default password or allowing insecure communication. Unfortunately, most of the population is not aware of these risks and does not know how to solve them. Thus, many homes are vulnerable to cyber infiltration and being acquired as part of malware botnets.

Today, tools exist that can identify vulnerable IoT devices. These tools operate on the Internet and are not designed to run inside a home network. Most home network IoT devices do not have public IP addresses, and therefore cannot be accessed by regular Internet scanning tools.

SUMMARY

Concepts and technologies disclosed herein are directed to home gateway monitoring for vulnerable home IoT devices. According to one aspect of the concepts and technologies disclosed herein, a home gateway system can include a processor and a memory. The memory can include instructions for an IoT vulnerability monitor that, when executed by the processor, cause the processor to perform operations. More particularly, the IoT vulnerability monitor can scan a home network address space of a home network for an IoT device. The IoT vulnerability monitor can determine a device category of the IoT device, a device status of the IoT device, and a permissions level of the IoT device based, at least in part, upon the device category and the device status. The device category can be a managed category, an unmanaged category, or a guest category. The device status can be a vulnerable status or a safe status. The permissions level of the IoT device can be an unrestricted permissions level, an Internet-only permissions level, or a quarantine permissions level.

The IoT vulnerability monitor can perform a vulnerability test on the IoT device to determine whether the IoT device is vulnerable to a known vulnerability. The known vulnerability can be a port vulnerability, a protocol vulnerability, a security vulnerability, an operating system vulnerability, a software vulnerability, a secure sockets layer ("SSL") vulnerability, or an evil twin vulnerability. In response to determining that the IoT device is vulnerable to the known vulnerability, the IoT vulnerability monitor can change the device status of the IoT device to the vulnerable status and can change a permissions level of the IoT device to the quarantine permissions level. Additionally, in response to determining that the IoT device is vulnerable to the known vulnerability, the IoT vulnerability monitor can alert an entity that the device status of the IoT device has changed to the vulnerable status.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description be within the scope of this disclosure.

DETAILED DESCRIPTION

Figure 1:
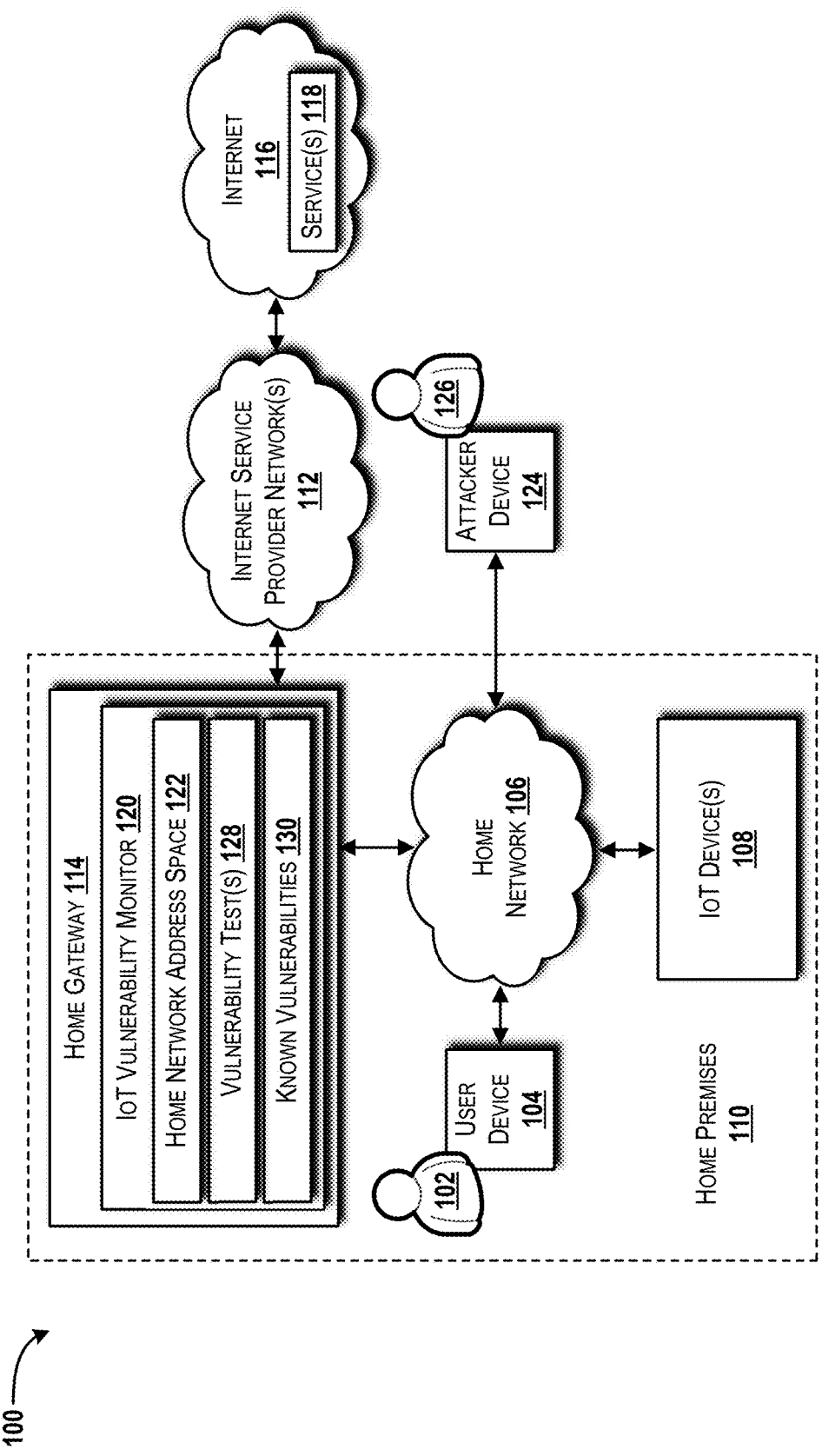
FIG. 1 is a block diagram illustrating aspects of an operating environment in which aspects of the concepts and technologies disclosed herein can be implemented.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for home gateway monitoring for vulnerable home IoT devices will be described.

Vulnerable IoT devices usually cannot be accessed directly from a home network because these devices do not have a public IP address. An attacker can still attack these devices in several ways. For example, an attacker can use an attacker device to hijack a request initiated by a target device and force the target device to open a communication channel with the attacker device. As another example, the attacker may have infiltrated the home network and compromised a device to hack other devices operating on the home network. The concepts and technologies disclosed herein can identify vulnerabilities among IoT devices connected to a home network and can help prevent attacks that take advantage of the vulnerabilities.

Turning now to FIG. 1, a block diagram illustrating aspects of an operating environment 100 in which aspects of the concepts and technologies disclosed herein can be implemented will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 includes a user 102 who is associated with a user device 104. The user device 104 generally can be any computing device that is capable of operating on and communicating with a home network 106, such as via a wired or wireless network connection. The user device 104 can be a personal computer (e.g., a desktop or laptop computer). The user device 104 can be a mobile device (best shown in FIG. 6), such as a cellular phone, a feature phone, a smartphone, a mobile computing device, a tablet computing device, a combination thereof, or the like. The user device 104 can be a media playback device, a set-top box, a video streaming device, a music streaming device, a video game console, a combination thereof, or the like. The user 102 also can be associated with one or more IoT devices 108 that are capable of operating on and communicating with the home network 106 within a home premises 110. The term "home" is used herein to broadly encompass a location in which the user 102 resides at least part time. As such, the home premises 110 can be a primary residence, a secondary residence, an office or other place of business, or any other location that the user 102 defines as their "home."

The user device 104 and the IoT device(s) 108 can communicate directly with the home network 106 (e.g., via an on-board ethernet and/or WI-FI component). The IoT device(s) 108 additionally or alternatively can communicate with the home network 106 through a hub device (not shown), which can communicate with the IoT device(s) 108 via a wireless technology such as Institute of Electrical and Electronics Engineers ("IEEE") 802.15.1 (commonly known as BLUETOOTH low energy or BLE), IEEE 802.11ah (HaLow), BLUETOOTH, ZIGBEE, Z-WAVE, other short-range communications technologies, other IoT-specific technologies, combinations thereof, and the like. The IoT devices 108 can communicate with each other using the same or similar technologies as those described above. It should be understood that as IoT technologies continue to mature, new communications protocols likely will be developed and improve upon existing technologies. The concepts and technologies disclosed herein are not limited to any particular technology(ies). Accordingly, the example technologies described herein should not be construed as being limiting in any way.

The home network 106 can be or can include one or more local area networks ("LANs"), including one or more wireless LANs ("WLANs") and/or one or more wired/fixed LANs (e.g., ethernet). The home network 106 can communicate with one or more Internet service provider ("ISP") network(s) 112 via a home gateway 114. The ISP network(s) 112 can be or can include one or more fixed broadband communications networks implemented via fiber optic, coaxial cable, digital subscriber line ("DSL"), broadband over power lines, a combination thereof, and/or the like. The ISP network(s) 112 can facilitate connectivity to other networks, such as the Internet 116, through which the user device 104 and the IoT device(s) 108 can access one or more services 118. The home gateway 114 can be or can include a modem that enables connectivity to the ISP network(s) 112. The home gateway 114 additionally can provide other functionality such as routing, switching, and the like for the home network 106. Aspects of the home gateway 114 can be enabled via firmware, software, hardware, or some combination thereof. In some embodiments, the home gateway 114 operates as a standalone device that is in communication with an existing modem, router, switch, or other network device. In some other embodiments, the home gateway 114 operates as a piggyback device that communicates directly with an existing modem, router, switch, or other network device. The home gateway 114 alternatively may be a proprietary device that provides the functionality described herein.

The IoT device(s) 108 can include one or more smart home devices such as thermostats, lights, cameras, security devices, smoke alarms, carbon monoxide alarms, locks, appliances, and the like. An example IoT device 400 is illustrated and described herein with reference to FIG. 4. The service(s) 118 can be or can include one or more IoT services, which can support the operation of the IoT device(s) 108. For example, the service(s) 118 can enable device setup, device registration, remote monitoring, remote control, and/or other interaction with the IoT device(s) 108. In some embodiments, the service(s) 118 can be accessed via the user device 104, which can execute a corresponding client application to enable the aforementioned functionality. For example, the IoT device 108 embodied as a smart thermostat may communicate with the service 118 to obtain temperature, humidity, and/or other settings to enable the user 102 to view and manage these settings from a remote device such as the user device 104. Those skilled in the art will appreciate that the services 118 can include any services utilized, at least in part, by the user device 104 and/or the IoT device(s) 108. Accordingly, the example services 118 described herein should not be construed as being limiting in any way.

The home gateway 114 can execute, via one or more processors (best shown in FIG. 5) one or more software modules, including an IoT vulnerability monitor 120. The IoT vulnerability monitor 120 can monitor the IoT device(s) 108 connected to the home network 106. For example, the IoT vulnerability monitor 120 can periodically scan a home network address space 122 to establish an inventory of devices previously attached and currently attached to the home network 106.

The IoT vulnerability monitor 120 can assign a device category to each of the IoT devices 108 found in the home network address space 122. The device category assigned by the IoT vulnerability monitor 120 can be a managed category, an unmanaged category, or a guest category (best shown in FIG. 2). A managed device has been certified through a certification process to ensure compliance with policies defined by an entity such as an ISP. An unmanaged device has not been certified in any way and is not beholden to any such policies. Any device that is not part of the known home device inventory can be assigned by the IoT vulnerability monitor 120 to the guest category. A guest device may belong to an actual guest, such as a friend, colleague, or family member, that visits the user 102 at the home premises 110 and wants to connect their device to the home network 106 while they visit. A guest device may belong to a new device that has not yet registered to the home network 106 as a constant member. A guest device may be a rogue device, such as an attacker device 124 associated with an attacker 126, that entered the home premises 110 without notice. An example for such scenarios may be the attacker device 124 (e.g., an IoT device itself) hidden in a delivered package or the attacker 126 may approach (e.g., drive by or on foot) the home premises 110 and try to connect the attacker device 124 to the home network 106 from the street or other nearby location to execute an attack.

For each of the IoT devices 108 found in the home network address space 122, the IoT vulnerability monitor 120 can run one or more vulnerability tests 128 to determine whether the IoT devices 108 are subject to one or more known vulnerabilities 130. The known vulnerabilities 130 can be port vulnerabilities, secure sockets layer ("SSL") or transport layer security ("TLS") vulnerabilities, password/authentication mechanism vulnerabilities, operating system vulnerabilities, software vulnerabilities, Evil Twin vulnerabilities, any combination thereof, and the like. Several examples of the known vulnerabilities 130 will be described below. Those skilled in the art will appreciate that new vulnerabilities can be added to the known vulnerabilities 130 as needed to ensure that the IoT vulnerability monitor 120 is maintained up-to-date. In some embodiments, the service(s) 118 can include an update service provided by a vendor, manufacturer, developer, or other entity to update the IoT device(s) 108, such as to patch one or more of the known vulnerabilities 130. The vendor, manufacturer, developer, or other entity may notify the IoT vulnerability monitor 120 when a new vulnerability is discovered so that the known vulnerabilities 130 of which the IoT vulnerability monitor 120 is aware is maintained as up-to-date as possible. If a fix is unavailable, the IoT vulnerability monitor 120 can take action to quarantine an affected device until the fix is available.

The IoT vulnerability monitor 120 also can assign a device status (best shown in FIG. 2) to each of the IoT devices 108 found in the home network address space 122. The device status can indicate whether a device is safe or vulnerable. In other words, whether the device is subject to any of the known vulnerabilities 130 based upon the results of the vulnerability test(s) 128.

Figure 2:
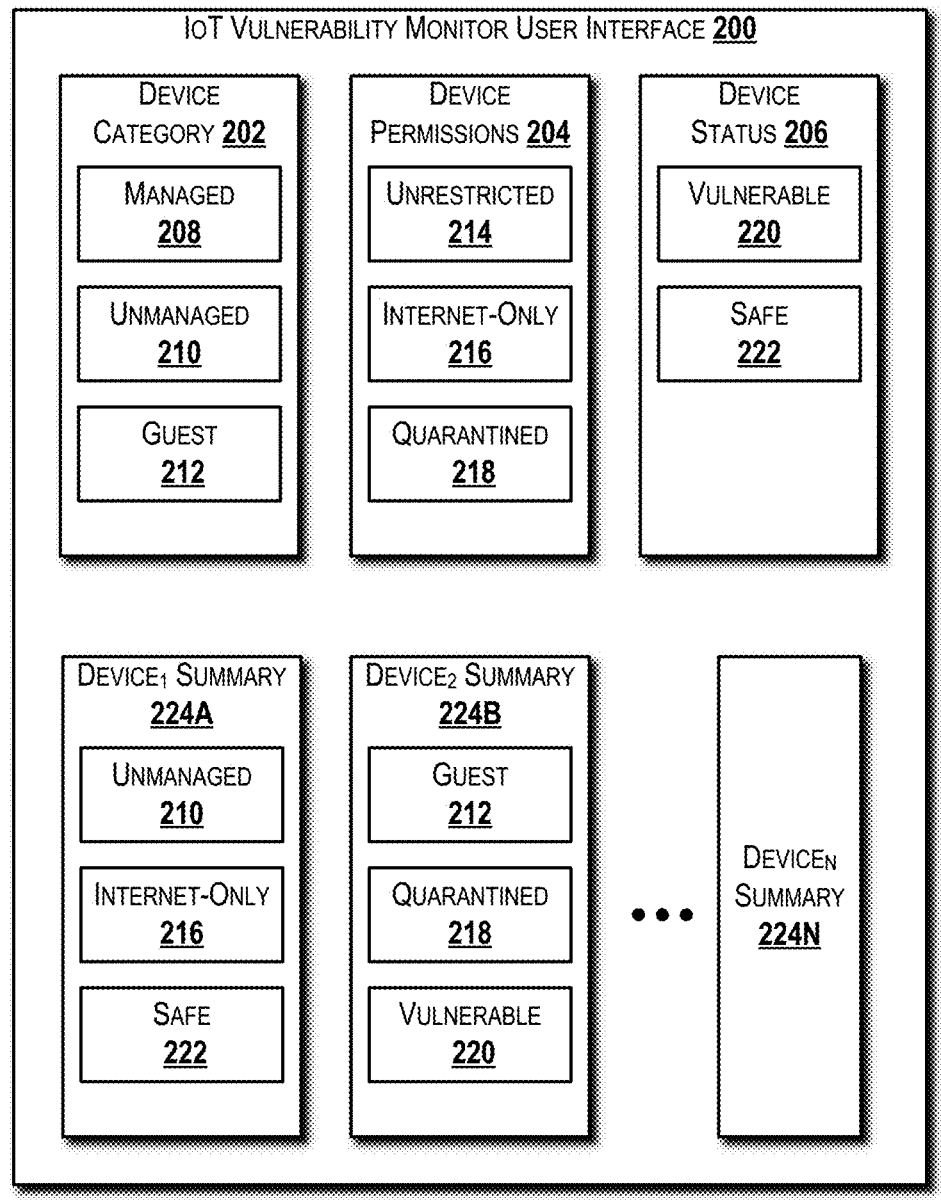
FIG. 2 is a user interface diagram illustrating an example IoT vulnerability monitor user interface capable of implementing aspects of the concepts and technologies disclosed herein.

Based upon the device category and the device status assigned to a given IoT device 108, the IoT vulnerability monitor 120 can determine a permissions level (best shown in FIG. 2). The permissions level can be unrestricted, Internet-only, or quarantined.

A port vulnerability can take advantage of a transfer control protocol ("TCP") or user datagram protocol ("UDP") port that is open and provides access to a service of an IoT device 108. For example, port 23 is used by Telnet protocol, and port 21 is used by file transfer protocol ("FTP"). The former allows a remote user to manipulate the file system and execute programs on the IoT device 108, while the latter allows copying files and placing new files, including malware. Many IoT devices available today use a common operating system with many services that the devices do not need. A good practice would be to disable all services (i.e., close all ports) except for those needed. Unfortunately, the common case is that developers leave all services active, such as the Telnet and FTP ports, and therefore expose a vulnerability for attackers to exploit.

SSL and its successor TLS are encryption protocols designed to provide secure communication between devices. These protocols are implemented by several software projects such as OpenSSL, Gnu TLS, Boring SSL, and LibreSSL. Software patches can be created to fix any vulnerabilities discovered in these software projects. Unfortunately, many IoT devices are not updated regularly, and therefore fail to receive the patch(es) to fix the vulnerabilities. An attacker can take advantage of this oversight to hack a device using the known vulnerability. In some embodiments, the IoT vulnerability monitor 120 can send probes to the IoT devices 108 to initiate a hypertext transfer protocol ("HTTP"). In response, the IoT vulnerability monitor 120 can receive information about the implementation of the SSL and/or TSL protocols and the configuration thereof for each of the IoT devices 108. An example of a vulnerable configuration uses OPENSSLDIR. This configuration indicates that all of the device configuration files and certificates are located under a known directory structure that starts in "C:/usr/local." If these locations are writable, anyone can modify the modules of the IoT devices 108 or bypass authentication mechanisms.

The IoT vulnerability monitor 120 can send connection requests to the IoT devices 108 over known open ports. When prompted with a request to enter authentication credentials, such as username and password, the IoT vulnerability monitor 120 can try common combinations. Many IoT devices 108 are factory set not to require a password. This allows the attacker 126 to log in, install malware, and attack the home network 106. Other IoT devices 108 use username and passwords that are preconfigured. For example, the combination of username "admin" and password "admin" is very popular and a common default username/password pair. Although instruction manuals often recommend that the username/password pair be changed from default, many users ignore this recommendation thereby exposing the IoT devices 108 to potential attack. In an effort to allow easier support of its devices, some vendors create a so-called "technician backdoor" using a separate default username/password pair. These credentials may be leaked to the Internet and allow an attacker to access the IoT devices 108 in the guise of a technician.

The IoT vulnerability monitor 120 can identify an operating system (best shown in FIG. 3) of the IoT devices 108 by sending TCP and UDP packets to the IoT devices 108 and analyzing the parameters received from the IoT devices 108 in response. These parameters can provide a fingerprint to identify different operating systems. Each operating system can have a list of the known vulnerabilities 130 specific to that operating system and a log of when the known vulnerabilities 130 were fixed (or pending fix). Thus, the IoT vulnerability monitor 120 can identify whether an operating system was patched for a certain vulnerability by exploiting the vulnerability and observing its reaction. The exploit usually does not harm the operating system. The harm instead is in the form of an unwanted response of the IoT device 108 that exposes some sensitive information or restricts portions of its memory.

For managed devices, the IoT vulnerability monitor 120 should know how to check for software versions that are considered risky for usage. The end user, such as the user 102, may block a software update due to time constraints, network speeds, network availability, and/or other reasons because the user 102 is unaware of the importance of the software update (e.g., the update addresses a newly-discovered vulnerability). Use of the IoT vulnerability monitor 120 helps the manufacturer inform the user 102 of problematic and/or outdated software versions and promotes the prompt acceptance of new updates.

The IoT devices 108 may use an SSL certificate to encrypt communications with a controlling server (e.g., a server operating as part of the service(s) 118). If the SSL certificate of the IoT device 108 is outdated or is not managed by a known certificate authority, the attacker 126 can intercept communications from the IoT device 108 and either extract sensitive data or hijack the communication to hack into the IoT device 108. The IoT vulnerability monitor 120 can initiate communication with the IoT device 108 and observe the parameters of any SSL certificate(s) the IoT device 108 uses. If the SSL certificate is invalid, the IoT vulnerability monitor 120 can alert the user 102 and take action according to a policy.

The IoT device(s) 108 may implement a common WI-FI network selection mechanism by which a WI-FI network is chosen from a preferred network list ("PNL") that includes WI-FI networks to which the IoT device 108 connected in the past and currently provide the best signal. In the case of mobile devices such as smartphones, the PNL may contain public SSID names for free WI-FI available from hotels, restaurants, retail stores, libraries, and/or the like. In addition, some of the IoT devices 108 may use a default SSID name for initial setup. In both cases, the attacker 126 can set up a malicious access point that uses a common SSID and, using a signal with high quality, convince the IoT device(s) 108 in the home network 106 to connect to the malicious access point. This attack is called an Evil Twin attack. The IoT vulnerability monitor 120 can try periodically to use one or more known SSID names to check if the IoT device(s) 108 are trying to connect to these networks. The fix to this problem is to have the IoT device(s) 108 forget common SSID networks.

Turning now to FIG. 2, a user interface diagram illustrating an example IoT vulnerability monitor user interface 200 will be described, according to an illustrative embodiment of the concepts and technologies disclosed herein. The IoT vulnerability monitor user interface 200 can be accessed by the user 102 locally on the home gateway 114. In some embodiments, the home gateway 114 includes a display on which the IoT vulnerability monitor user interface 200 can be presented. In some other embodiments, the user 102 can access the IoT vulnerability monitor user interface 200 via another device, such as the user device 104. This access can be via an internal website accessible only from the home network 106. Additionally or alternatively, the user device 104 may have an IoT vulnerability monitor client application installed through which the user 102 can access the IoT vulnerability monitor user interface 200. Remote access to the IoT vulnerability monitor 120 via the Internet 116 is also contemplated. In any case, the user 102 can interact with the IoT vulnerability monitor user interface 200 via touch, keyboard, mouse, gesture, voice, other input mechanisms, combinations thereof, and/or the like. The IoT vulnerability monitor user interface 200 can be designed with text, graphics, sounds, animations, highlights, lowlights, colors, grayscale, and/or other design considerations to provide a satisfying user experience for the user 102. The layout of text, graphics, animations, and/or other visual objects within the IoT vulnerability monitor user interface 200 can any layout that is suitable for a given implementation. Accordingly, the layout of the illustrated IoT vulnerability monitor user interface 200 should not be construed as being limiting in any way.

The illustrated IoT vulnerability monitor user interface 200 includes a device category object 202, a device permissions object 204, and a device status object 206. The illustrated device category object 202 includes a managed category object 208, an unmanaged category object 210, and a guest category object 212 that can be used to categorize the IoT devices 108 in the manner described herein. The illustrated device permissions object 204 includes an unrestricted permissions level object 214, an Internet-only permissions level object 216, and a quarantined permissions level object 218. The IoT vulnerability monitor 120 can determine which permissions level to assign to a given IoT device 108 based upon the device category and device status assigned to that IoT device 108. The illustrated device status object 206 includes a vulnerable status object 220 and a safe status object 222 to represent the two possible states of the IoT devices 108 with regard to known vulnerability.

The illustrated IoT vulnerability monitor user interface 200 also includes a first device summary 224A, a second device summary 224B, and up to an $n^{th}$ device summary 224N. Each of the device summaries 224A-224N can provide a quick visual reference for the device category, device status, and device permissions assigned to one of the IoT devices 108. In the illustrated example, the first device summary 224A indicates that the subject device is categorized as unmanaged 210, its current status is safe 222, and permissions are Internet-only 216. The second device summary 224B indicates that the subject device is categorized as guest 212 (i.e., the device is not a constant in the home network address space 122), its current status is vulnerable 220, and permissions are the device is quarantined 218.

Figure 3:
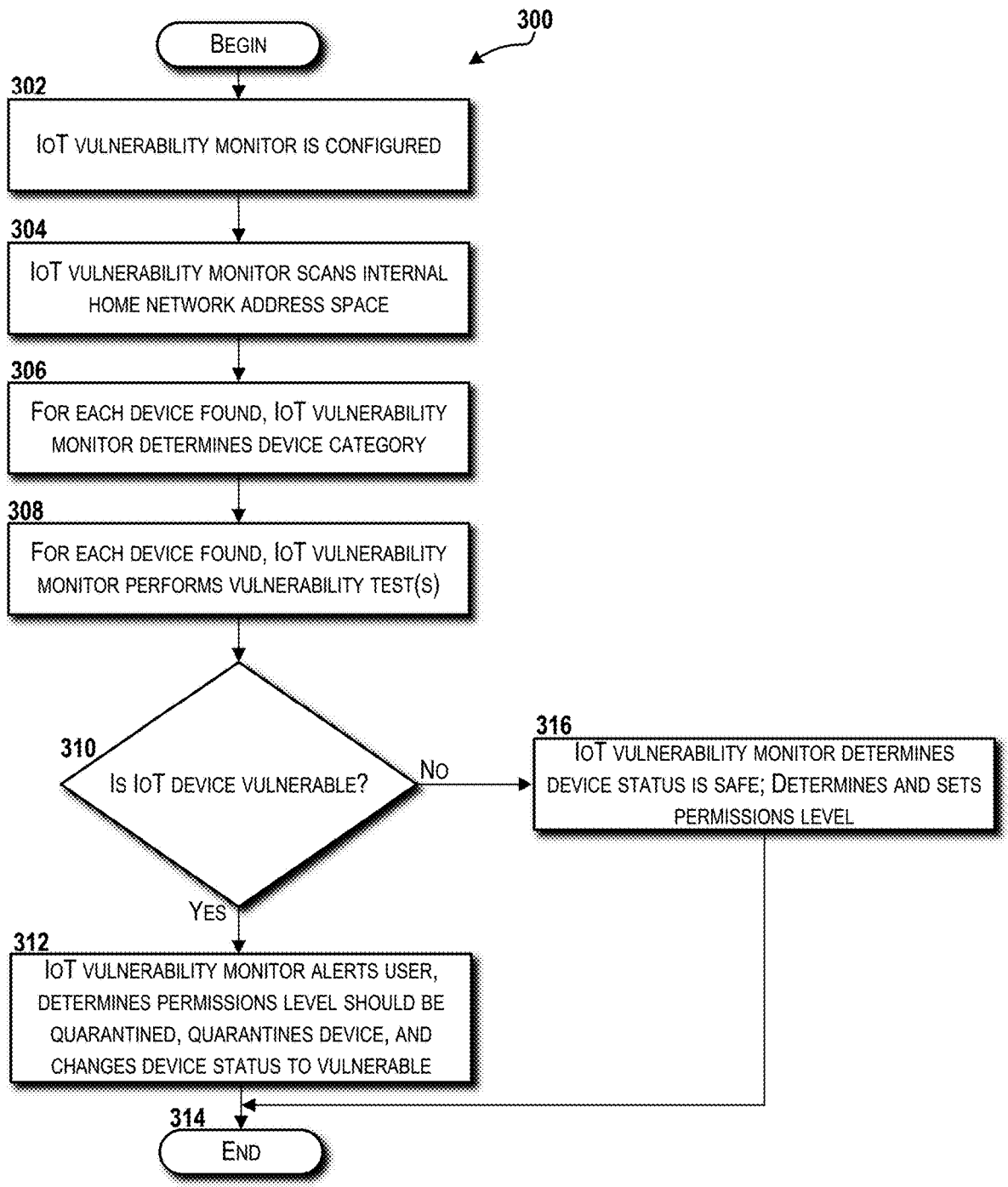
FIG. 3 is a flow diagram illustrating aspects of a method for monitoring IoT devices for vulnerabilities, according to an illustrative embodiment of the concepts and technologies disclosed herein.

Turning now to FIG. 3, a flow diagram illustrating aspects of a method 300 for monitoring IoT devices 108 for vulnerabilities 130 will be described, according to an illustrative embodiment of the concepts and technologies disclosed herein. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operation 302. At operation 302, the IoT vulnerability monitor 120, executed by one or more processors of the home gateway 114, can be configured. The IoT vulnerability monitor 120 can be configured by the ISP that provides the ISP network(s) 112, a vendor of the home gateway 114, a manufacturer of the home gateway 114, the user 102, another entity, or a combination thereof. In particular, the IoT vulnerability monitor 120 can be configured to apply one or more policies. An example policy can define what severity level of a vulnerability should trigger a device quarantine. Another example policy can specify whether or not the user 102 can override a permission level determined for the IoT device(s) 108. Other policies can be defined based upon the needs of a given implementation.

From operation 302, the method 300 proceeds to operation 304. At operation 304, the IoT vulnerability monitor 120 scans the internal home network address space 122 to determine the IoT device(s) 108 that have connected to the home network 106. The IoT vulnerability monitor 120 can scan the internal home network address space 122 periodically such as hourly or daily. The periodicity can be defined in policy during the configuration at operation 302. The IoT vulnerability monitor 120 can scan the internal home network address space 122 on-demand such as in response to a request made by the user 102.

From operation 304, the method 300 proceeds to operation 306. At operation 306, the IoT vulnerability monitor 120 determines a device category (i.e., managed, unmanaged, or guest) for each of the IoT devices 108 identified in the scan at operation 304. Although three specific device categories are described herein, other device categories are contemplated and can be defined in one or more policies. Moreover, a policy can identify the make, model, serial numbers, software version, operating system versions, and/or other information about the IoT device(s) 108 that are to be considered managed. For example, the IoT vulnerability monitor 120 can coordinate with the ISP to obtain a list of certified devices. Another policy can define what constitutes a guest.

From operation 306, the method 300 proceeds to operation 308. At operation 308, the IoT vulnerability monitor 120 performs the vulnerability test(s) 128. The policy defined at operation 302 can specify the vulnerability test(s) 128 to be performed for each category of device. For example, an unmanaged device may have a first set of vulnerability tests 128, a managed device may have a second set of vulnerability tests 128, and a guest device may have a third set of vulnerability tests 128. The managed device may have more specific vulnerability tests 128 due, in part, to the certification requirements of the managed device and additional information the home gateway 114 may know about the managed device. As mentioned above, the known vulnerabilities 130 can be port vulnerabilities, SSL or TLS vulnerabilities, password/authentication mechanism vulnerabilities, operating system vulnerabilities, software vulnerabilities, Evil Twin vulnerabilities, any combination thereof, and the like. Each of the vulnerability tests 128 can be designed to test the IoT devices 108 for one or more of the known vulnerabilities 130.

From operation 308, the method 300 proceeds to operation 310. At operation 310, the IoT vulnerability monitor 120 determines whether the IoT device 108 is vulnerable based upon the results of the vulnerability test(s) 128. If, at operation 310, the IoT vulnerability monitor 120 determines that the IoT device 108 is vulnerable (i.e., the IoT device failed one or more of the vulnerability tests 128), the method 300 proceeds to operation 312. At operation 312, the IoT vulnerability monitor 120 can alert the user 102. The alert can be a visual, audio, or combination of video and audio alert. The alert can be presented by the home gateway 114 such as via a display and/or via a speaker of the home gateway 114. The alert can be presented by the user device 104. At operation 312, the IoT vulnerability monitor 120 also can determine that the device status should be changed to vulnerable 220. At operation 312, the IoT vulnerability monitor 120 also can determine that the permissions level for the IoT device 108, based on the device category and the device status, should be quarantined 218. The IoT vulnerability monitor 120 can quarantine the IoT device 108 until the vulnerability(ies) is/are resolved.

From operation 312, the method 300 proceeds to operation 314. The method 300 can end at operation 314.

Returning to operation 310, if the IoT vulnerability monitor 120 determines that the IoT is not vulnerable (i.e., the IoT device passed the vulnerability test(s) 128), the method 300 proceeds to operation 316. At operation 316, the IoT vulnerability monitor 120 determines that the device status is safe 222 (e.g., confirms safe status as the assumed status). Also at operation 316, the IoT vulnerability monitor 120 can determine the permissions level based upon the device category and the device status. The permissions level may be Internet-only 216 or unrestricted 214. Although not shown in FIG. 3, the method 300 can provide the user 102 an opportunity to override the permissions level. As noted above, whether or not an override function is available can be determined based upon a policy.

From operation 316, the method 300 proceeds to operation 314. The method 300 can end at operation 314.

Figure 4:
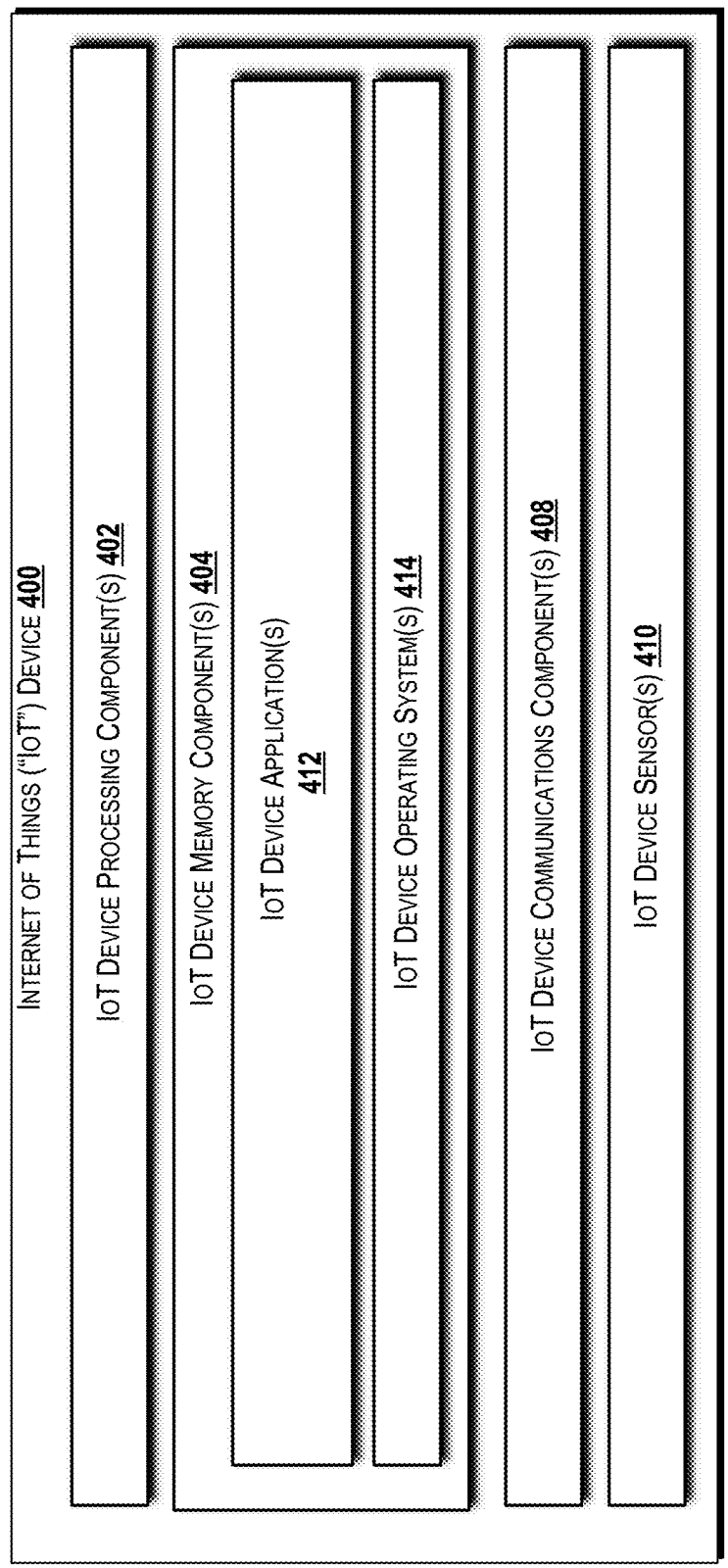
FIG. 4 is a block diagram illustrating an example IoT device capable of implementing aspects of the concepts and technologies disclosed herein.

Turning now to FIG. 4, a block diagram illustrating aspects of an example IoT device 400 and components thereof capable of implementing aspects of the embodiments presented herein will be described. In some embodiments, one or more of the IoT devices 108 is/are configured similar to or the same as the IoT device 400. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

The illustrated IoT device 400 includes one or more IoT device processing components 402, one or more IoT device memory components 404, one or more IoT device communications components 408, and one or more IoT device sensors 410. The IoT device processing components 402 can include one or more hardware components that perform computations to process data, and/or to execute computer-executable instructions of one or more application programs such as one or more IoT device application(s) 412, one or more IoT device operating system(s) 414, and/or other software. The IoT device processing component(s) 402 can include one or more CPUs configured with one or more processing cores. The IoT device processing component(s) 402 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the IoT device processing component(s) 402 can include one or more discrete GPUs. In some other embodiments, the IoT device processing component(s) 402 can include CPU and GPU components that are configured in accordance with a co-processing CPU/GPU computing model, wherein the sequential part of an application executes on the CPU and the computationally-intensive part is accelerated by the GPU. The IoT device processing component(s) 402 can include one or more system on a chip ("SoC") components along with one or more other components illustrated as being part of the IoT device 400, including, for example, the IoT device memory component 404, the IoT device communications component(s) 408, the IoT device sensor(s) 410, or some combination thereof. In some embodiments, the IoT device processing component(s) 402 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more OMAP SoCs, available from TEXAS INSTRUMENTS of Dallas, Texas; one or more customized versions of any of the above SoCs; and/or one or more proprietary SoCs. The IoT device processing component(s) 402 can be or can include one or more hardware components architected in accordance with an ARM architecture, available for license from ARM HOLDINGS of Cambridge, United Kingdom. Alternatively, the IoT device processing component(s) 402 can be or can include one or more hardware components architected in accordance with an x86 architecture, such an architecture available from INTEL CORPORATION of Mountain View, California, and others. Those skilled in the art will appreciate the implementation of the IoT device processing component(s) 402 can utilize various computation architectures, and as such, the IoT device processing component(s) 402 should not be construed as being limited to any particular computation architecture or combination of computation architectures, including those explicitly disclosed herein.

The IoT device memory component(s) 404 can include one or more hardware components that perform storage operations, including temporary or permanent storage operations. In some embodiments, the IoT device memory component(s) 404 can include volatile and/or non-volatile memory implemented in any method or technology for storage of information such as computer-readable instructions, data structures, program modules, the IoT device operating system(s) 414, the IoT device application(s) 412, combinations thereof, and/or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the IoT device processing component(s) 402.

The IoT device application(s) 412 can be executed by the IoT device processing component(s) 402 to perform various IoT operations. For example, the IoT device application(s) 412 can instruct the IoT device sensor(s) 410 to collect data and share the data with the service(s) 118. The IoT device application(s) 412 can execute on top of the IoT device operating system(s) 414. In some embodiments, the IoT device application(s) 412 can be provided as firmware.

The IoT device operating system(s) 414 can control the operation of the IoT device 400. In some embodiments, the IoT device operating system(s) 414 includes the functionality of the IoT device application(s) 412. The IoT device operating system(s) 414 can be executed by the IoT device processing component(s) 402 to cause the IoT device 400 to perform various operations. The IoT device operating system(s) 414 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The IoT device sensor(s) 410 can include any sensor type or combination of sensor types utilizing any known sensor technology that is capable of detecting one or more characteristics of an environment in which the IoT device 400 is deployed. More particularly, the IoT device sensor(s) 410 can include, but are not limited to, lighting control sensor, appliance control sensor, security sensor, alarm sensor, medication dispenser sensor, entry/exit detector sensor, video sensor, camera sensor, alarm sensor, motion detector sensor, door sensor, window sensor, window break sensor, outlet control sensor, vibration sensor, occupancy sensor, orientation sensor, water sensor, water leak sensor, flood sensor, temperature sensor, humidity sensor, smoke detector sensor, carbon monoxide detector sensor, doorbell sensor, dust detector sensor, air quality sensor, light sensor, gas sensor, fall detector sensor, weight sensor, blood pressure sensor, IR sensor, HVAC sensor, smart home sensor, thermostats, other security sensors, other automation sensors, other environmental monitoring sensors, other healthcare sensors, multipurpose sensor that combines two or more sensors, the like, and/or combinations thereof. Those skilled in the art will appreciate the applicability of the IoT device sensors 410 to various aspects of the services 118, and for this reason, additional details in this regard are not provided.

The IoT device communications component(s) 408 can include an RF transceiver or separate receiver and transmitter components. The IoT device communications component 408 can include one or more antennas and one or more RF receivers for receiving RF signals from and one or more RF transmitters for sending RF signals to other IoT devices 400, the home network 106, and/or the home gateway 114. It is contemplated that the IoT device communications component(s) 408 also may include a wired connection to the home network 106.

Figure 5:
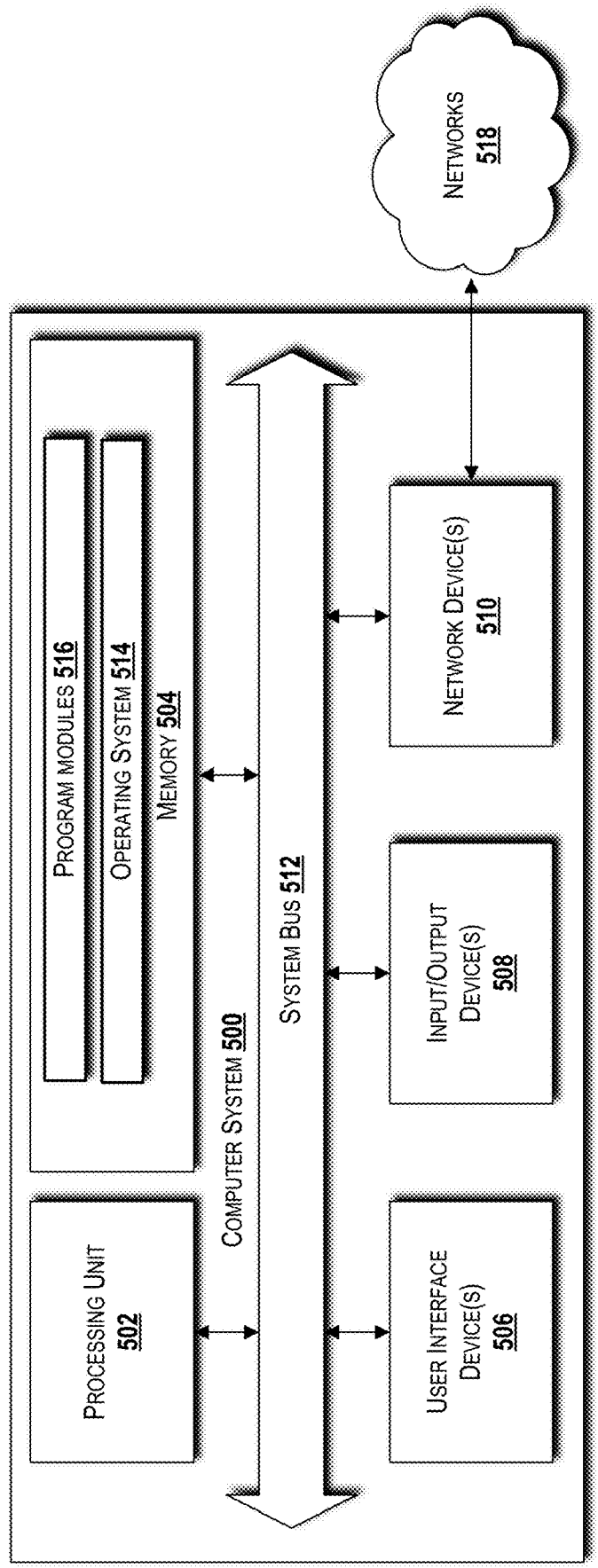
FIG. 5 is a block diagram illustrating an example computer system capable of implementing aspects of the concepts and technologies disclosed herein.

Turning now to FIG. 5, a block diagram illustrating a computer system 500 configured to provide the functionality described herein in accordance with various embodiments. In some embodiments, aspects of the user device 104, the home gateway 114, the attacker device 124, one or more systems/devices operating on or in communication with the home network 106, one or more systems operating on or in communication with the ISP network(s) 116, one or more systems operating on or in communication with the Internet 116, one or more systems associated with the service(s) 118, or other systems disclosed herein can be configured the same as or similar to the computer system 500.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 502 can be a single processing unit or a multiple processing unit that includes more than one processing component. Processing units are generally known, and therefore are not described in further detail herein.

The memory 504 communicates with the processing unit 502 via the system bus 512. The memory 504 can include a single memory component or multiple memory components. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/ or families of operating systems from APPLE CORPORATION, a member of the ANDROID OS family of operating systems from GOOGLE LLC, the FREEBSD family of operating systems, the SOLARIS family of operating systems from ORACLE CORPORATION, other operating systems, and the like.

The program modules 516 may include various software and/or program modules described herein. The program modules 516 can include, for example, the IoT vulnerability monitor 120. In some embodiments, multiple implementations of the computer system 500 can be used, wherein each implementation is configured to execute one or more of the program modules 516. The program modules 516 and/or other programs can be embodied in computer-readable media containing instructions that, when executed by the processing unit 502, perform the method 300 described herein. According to embodiments, the program modules 516 may be embodied in hardware, software, firmware, or any combination thereof. The memory 504 also can be configured to store data described herein.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media, and therefore should be construed as being directed to "non-transitory" media only.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, a touch-sensitive surface, or an electronic stylus. Further, the I/O devices 508 may include one or more output devices.

The network devices 510 enable the computer system 500 to communicate with one or more networks 518, such as the home network 106, ISP network(s) 112, and/or the Internet 116 described herein. Examples of the network devices 510 include, but are not limited to, a modem, a radio frequency ("RF") or infrared ("IR") or ultraviolet ("UV") transceiver, a telephonic interface, a bridge, a router, or a network card. The network 518 may include a WLAN, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 518 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
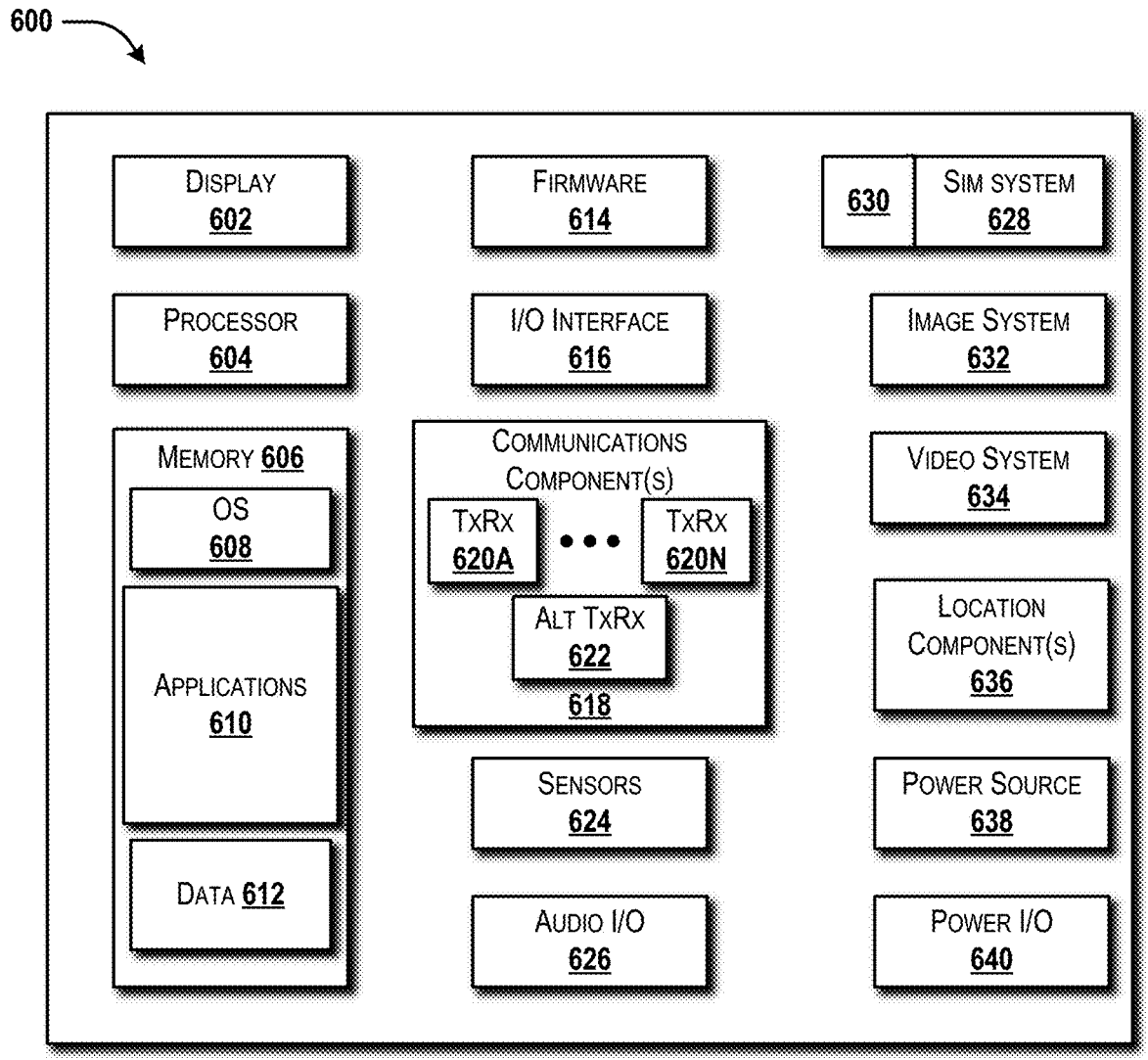
FIG. 6 is a block diagram illustrating an example mobile device capable of implementing aspects of the concepts and technologies disclosed herein.

Turning now to FIG. 6, an illustrative mobile device 600 and components thereof will be described. In some embodiments, the user device 104 can be configured the same as or similar to the mobile device 600. In some embodiments, the attacker device 124 can be configured the same as or similar to the mobile device 600. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 600 can also include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in the memory 606, or the like. The applications 610 can include, for example, a client application or companion application associated with the home gateway 114. In some embodiments, the applications 610 can also include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE LLC, a member of the TIZEN OS family of operating systems from THE LINUX FOUNDATION, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering/deleting data, entering and setting user IDs and passwords for device access, configuring settings, manipulating content and/or settings, multimode interaction, interacting with other applications 610, and otherwise facilitating user interaction with the operating system 608, the applications 610, and/or other types or instances of data 612 that can be stored at the mobile device 600.

The applications 610, the data 612, and/or portions thereof can be stored in the memory 606 and/or in a firmware 614, and can be executed by the processor 604. The firmware 614 can also store code for execution during device power up and power down operations. It can be appreciated that the firmware 614 can be stored in a volatile or non-volatile data storage device including, but not limited to, the memory 606 and/or a portion thereof.

The mobile device 600 can also include an input/output ("I/O") interface 616. The I/O interface 616 can be configured to support the input/output of data such as location information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, wearables, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 can also include a communications component 618. The communications component 618 can be configured to interface with the processor 604 to facilitate wired and/or wireless communications with one or more networks, such as the ISP network(s) 112, the Internet 116, the home network 106, the network(s) 518, or some combination thereof. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments, one or more of the transceivers of the communications component 618 may be configured to communicate using GSM, CDMA CDMAONE, CDMA2000, LTE, and various other 2G, 2.5G, 3G, 4G, 4.5G, 5G, 6G, 7G, and greater generation technology standards. Moreover, the communications component 618 may facilitate communications over various channel access methods (which may or may not be used by the aforementioned standards) including, but not limited to, TDMA, FDMA, CDMA, W-CDMA, OFDMA, SDMA, and the like.

In addition, the communications component 618 may facilitate data communications using GPRS, EDGE, the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, 5G technologies and standards, and various other current and future wireless data access technologies and standards. In the illustrated embodiment, the communications component 618 can include a first transceiver ("TxRx") 620A that can operate in a first communications mode (e.g., GSM). The communications component 618 can also include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 can also include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 can also facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 can also include one or more sensors 624. The sensors 624 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 can also include a subscriber identity module ("SIM") system 628. The SIM system 628 can include a universal SIM ("USIM"), a universal integrated circuit card ("UICC"), embedded SIM ("eSIM"), and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Additionally, or alternatively, an embedded SIM may be used. Because other devices and/or modules for identifying users and/or the mobile device 600 are contemplated, it should be understood that these embodiments are illustrative, and should not be construed as being limiting in any way.

The mobile device 600 can also include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another device. The video and/or photo content can also be shared with other devices via various types of data transfers via wired and/or wireless communication devices as described herein.

The mobile device 600 can also include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 can also be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 can also include a power source 638. The power source 638 can include one or more batteries, power supplies, power cells, and/or other power subsystems including alternating current ("AC") and/or direct current ("DC") power devices. The power source 638 can also interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein, such as the computer system 500 described above with reference to FIG. 5. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 600 in order to store and execute the software also components presented herein. It is contemplated that the mobile device 600 may not include all of the components shown in FIG. 6, may include other components that are not explicitly shown in FIG. 6, or may utilize an architecture completely different than that shown in FIG. 6.

Figure 7:
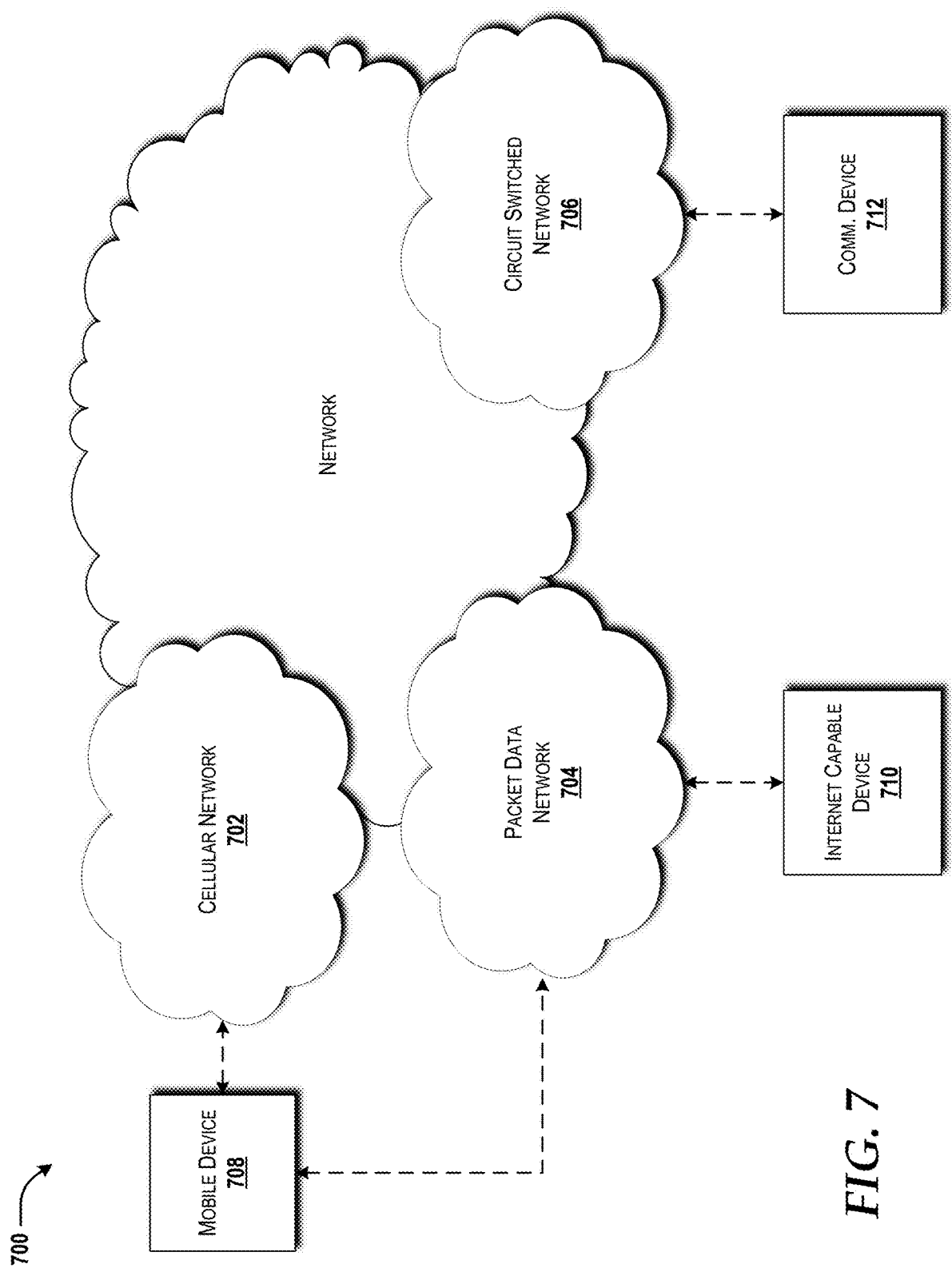
FIG. 7 is a block diagram illustrating an example network capable of implementing aspects of the concepts and technologies disclosed herein.

Turning now to FIG. 7, details of a network 700 are illustrated, according to an illustrative embodiment. The network 700 includes a cellular network 702, a packet data network 704, and a circuit switched network 706. The cellular network 702 includes various components such as, but not limited to, base stations, base transceiver stations ("BTSs"), node Bs ("NBs"), eNBs, gNBs, base station controllers ("BSCs"), radio network controllers ("RNCs"), mobile switching centers ("MSCs"), mobility management entities ("MMEs"), serving gateways ("SGWs"), packet data gateways ("PDGs"), evolved PDGs ("ePDGs"), AAA servers, home subscriber servers, short message service centers ("SMSCs"), multimedia messaging service centers ("MMSCs"), home location registers ("HLRs"), visitor location registers ("VLRs"), charging platforms, billing platforms, voicemail platforms, GPRS core network components, EPC core network components, future generation core network components, location service nodes, virtualizations thereof, combinations thereof, and/or the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the user device 104, the mobile device 600, a cellular telephone, a user equipment, a mobile terminal, a PDA, a laptop computer, a handheld computer, and combinations thereof, can be operatively connected to the cellular network 702 and/or the packet data network 704. The mobile communications device 708 can be configured similar to or the same as the mobile device 600 described above with reference to FIG. 6.

The cellular network 702 can be configured as a GSM network and can provide data communications via GPRS and/or EDGE. Additionally, or alternatively, the cellular network 702 can be configured as a 3G UMTS network and can provide data communications via the HSPA protocol family, for example, HSDPA, EUL, and HSPA+. The cellular network 702 also is compatible with mobile communications standards such as LTE, 5G-NR, or the like, as well as evolved and future mobile standards.

The packet data network 704 includes various systems, devices, servers, computers, databases, and other devices in communication with one another, as is generally known. In some embodiments, the packet data network 704 is or includes one or more WI-FI networks, such as the home network 106, each of which can include one or more WI-FI access points. The packet data network 704 also can include routers, switches, and other WI-FI network components. The packet data network 704 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable systems/devices 710 such as a laptop, a portable device, or another suitable device, can communicate with one or more cellular networks 702, and devices connected thereto, through the packet data network 704. It also should be appreciated that the mobile device 708, such as the user device 104, can communicate directly with the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710.

Figure 8:
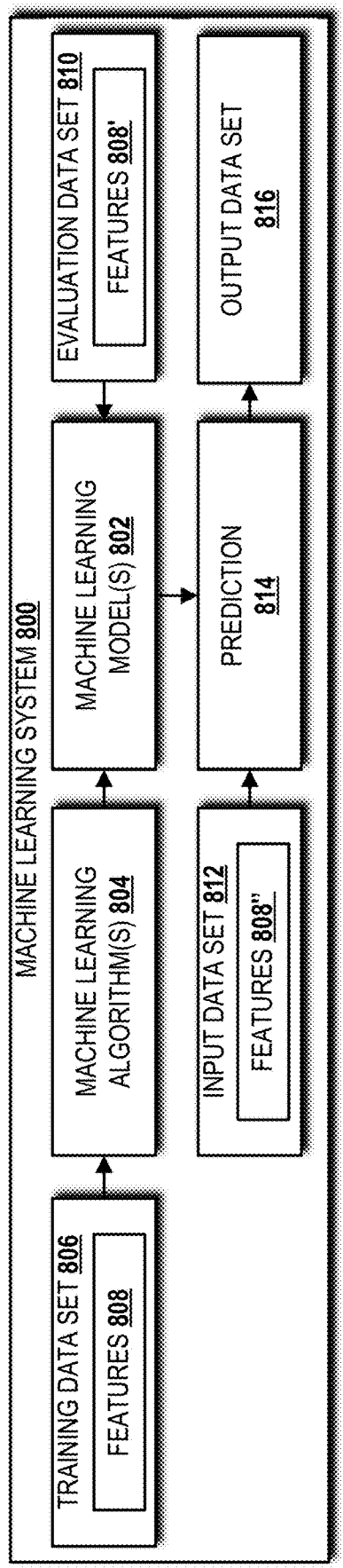
FIG. 8 is a block diagram illustrating an example machine learning system capable of implementing aspects of the concepts and technologies disclosed herein.

Turning now to FIG. 8, a machine learning system 800 capable of implementing aspects of the embodiments disclosed herein will be described. In some embodiments, the home gateway 114 can include the machine learning system 800. In other embodiments, the home gateway 114 can operate in communication with the machine learning system 800. In any case, the machine learning system 800 can be used to determine trends in the known vulnerabilities 130, create the vulnerability test(s) 128, and/or modify the vulnerability tests(s) 128.

The illustrated machine learning system 800 includes one or more machine learning models 802. The machine learning models 802 can include unsupervised, supervised, and/or semi-supervised learning models. The machine learning model(s) 802 can be created by the machine learning system 800 based upon one or more machine learning algorithms 804. The machine learning algorithm(s) 804 can be any existing, well-known algorithm, any proprietary algorithms, or any future machine learning algorithm. Some example machine learning algorithms 804 include, but are not limited to, neural networks, gradient descent, linear regression, logistic regression, linear discriminant analysis, classification tree, regression tree, Naive Bayes, K-nearest neighbor, learning vector quantization, support vector machines, any of the algorithms described herein, and the like. Classification and regression algorithms might find particular applicability to the concepts and technologies disclosed herein. Those skilled in the art will appreciate the applicability of various machine learning algorithms 804 based upon the problem(s) to be solved by machine learning via the machine learning system 800.

The machine learning system 800 can control the creation of the machine learning models 802 via one or more training parameters. In some embodiments, the training parameters are selected by machine learning modelers at the direction of an entity (e.g., a device manufacturer, ISP, other service provider, the user 102). Alternatively, in some embodiments, the training parameters are automatically selected based upon data provided in one or more training data sets 806. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 804 converges to the optimal weights. The machine learning algorithm 804 can update the weights for every data example included in the training data set 806. The size of an update is controlled by the learning rate. A learning rate that is too high might prevent the machine learning algorithm 804 from converging to the optimal weights. A learning rate that is too low might result in the machine learning algorithm 804 requiring multiple training passes to converge to the optimal weights.

The model size is regulated by the number of input features ("features") 808 in the training data set 806. A greater the number of features 808 yields a greater number of possible patterns that can be determined from the training data set 806. The model size should be selected to balance the resources (e.g., compute, memory, storage, etc.) needed for training and the predictive power of the resultant machine learning model 802.

The number of training passes indicates the number of training passes that the machine learning algorithm 804 makes over the training data set 806 during the training process. The number of training passes can be adjusted based, for example, on the size of the training data set 806, with larger training data sets being exposed to fewer training passes in consideration of time and/or resource utilization. The effectiveness of the resultant machine learning model 802 can be increased by multiple training passes.

Data shuffling is a training parameter designed to prevent the machine learning algorithm 804 from reaching false optimal weights due to the order in which data contained in the training data set 806 is processed. For example, data provided in rows and columns might be analyzed first row, second row, third row, etc., and thus an optimal weight might be obtained well before a full range of data has been considered. By data shuffling, the data contained in the training data set 806 can be analyzed more thoroughly and mitigate bias in the resultant machine learning model 802.

Regularization is a training parameter that helps to prevent the machine learning model 802 from memorizing training data from the training data set 806. In other words, the machine learning model 802 fits the training data set 806, but the predictive performance of the machine learning model 802 is not acceptable. Regularization helps the machine learning system 800 avoid this overfitting/memorization problem by adjusting extreme weight values of the features 808. For example, a feature that has a small weight value relative to the weight values of the other features in the training data set 806 can be adjusted to zero.

The machine learning system 800 can determine model accuracy after training by using one or more evaluation data sets 810 containing the same features 808' as the features 808 in the training data set 806. This also prevents the machine learning model 802 from simply memorizing the data contained in the training data set 806. The number of evaluation passes made by the machine learning system 800 can be regulated by a target model accuracy that, when reached, ends the evaluation process and the machine learning model 802 is considered ready for deployment.

After deployment, the machine learning model 802 can perform a prediction operation ("prediction") 814 with an input data set 812 having the same features 808" as the features 808 in the training data set 806 and the features 808' of the evaluation data set 810. The results of the prediction 814 are included in an output data set 816 consisting of predicted data. The machine learning model 802 can perform other operations, such as regression, classification, and others. As such, the example illustrated in FIG. 8 should not be construed as being limiting in any way.

Based on the foregoing, it should be appreciated that aspects of home gateway monitoring for vulnerable home IoT devices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A home gateway system comprising:
a processor; and
a memory comprising instructions for an Internet of Things ("IoT") vulnerability monitor that, when executed by the processor, cause the processor to perform operations comprising
scanning a home network address space of a home network for an IoT device,
determining a device category of the IoT device, wherein the device category comprises at least one of a managed category, an unmanaged category, or a guest category, wherein the managed category is associated with IoT devices certified through a certification process, wherein the unmanaged category is associated with IoT devices that are not certified through the certification process, and wherein the guest category is associated with IoT devices not previously associated with the home network,
determining, based on the device category of the IoT device, a set of vulnerability tests to be performed on the IoT device, wherein a different set of vulnerability tests is performed on another IoT device of a different device category,
performing a vulnerability test of the set of vulnerability tests on the IoT device to determine whether the IoT device is vulnerable to a known vulnerability, wherein performing the vulnerability test on the IoT device comprises
sending a communications packet to the IoT device,
receiving, in response to the communications packet, at least one parameter from the IoT device,
analyzing the at least one parameter from the IoT device to identify an operating system of the IoT device,
determining a known vulnerability specific to the operating system of the IoT device, wherein the known vulnerability comprises the known vulnerability specific to the operating system of the IoT device,
exploiting the known vulnerability specific to the operating system of the IoT device, and
observing a reaction of the operating system in response to exploiting the known vulnerability specific to the operating system of the IoT device to determine whether the operating system of the IoT device was patched for the known vulnerability specific to the operating system of the IoT device, and
in response to determining that the IoT device is vulnerable to the known vulnerability,
changing a device status of the IoT device to a vulnerable status and changing a permissions level of the IoT device to a quarantine permissions level, and
alerting an entity that the device status of the IoT device has changed to the vulnerable status.

2. The home gateway system of claim 1, wherein the operations further comprise performing a further vulnerability test of the set of vulnerability tests on the IoT device to determine whether the IoT device is vulnerable to a further known vulnerability, and wherein the further known vulnerability comprises a port vulnerability, a protocol vulnerability, a security vulnerability, a software vulnerability, a secure sockets layer vulnerability, or an evil twin vulnerability.

3. The home gateway system of claim 1, wherein the operations further comprise determining the permissions level of the IoT device based, at least in part, upon the device category and the device status.

4. The home gateway system of claim 1, wherein the device status comprises the vulnerable status or a safe status.

5. The home gateway system of claim 1, wherein the permissions level of the IoT device comprises an unrestricted permissions level, an Internet-only permissions level, or the quarantine permissions level, and wherein changing the permissions level of the IoT device to the quarantine permissions level comprises changing the permissions level of the IoT device from either the unrestricted permissions level or the Internet-only permissions level to the quarantine permissions level.

6. A method comprising:
scanning, by an Internet of Things ("IoT") vulnerability monitor executed by a processor of a home gateway system, a home network address space of a home network for an IoT device;
determining, by the IoT vulnerability monitor, a device category of the IoT device, wherein the device category comprises at least one of a managed category, an unmanaged category, or a guest category, wherein the managed category is associated with IoT devices certified through a certification process, wherein the unmanaged category is associated with IoT devices that are not certified through the certification process, and wherein the guest category is associated with IoT devices not previously associated with the home network;

determining, by the IoT vulnerability monitor, based on the device category of the IoT device, a set of vulnerability tests to be performed on the IoT device, wherein a different set of vulnerability tests is performed on another IoT device of a different device category;

performing, by the IoT vulnerability monitor, a vulnerability test of the set of vulnerability tests on the IoT device to determine whether the IoT device is vulnerable to a known vulnerability, wherein performing the vulnerability test on the IoT device comprises sending a communications packet to the IoT device, receiving, in response to the communications packet, at least one parameter from the IoT device, analyzing the at least one parameter from the IoT device to identify an operating system of the IoT device, determining a known vulnerability specific to the operating system of the IoT device, wherein the known vulnerability comprises the known vulnerability specific to the operating system of the IoT device, exploiting the known vulnerability specific to the operating system of the IoT device, and observing a reaction of the operating system in response to exploiting the known vulnerability specific to the operating system of the IoT device to determine whether the operating system of the IoT device was patched for the known vulnerability specific to the operating system of the IoT device; and in response to determining that the IoT device is vulnerable to the known vulnerability, changing, by the IoT vulnerability monitor, a device status of the IoT device to a vulnerable status and changing a permissions level of the IoT device to a quarantine permissions level, and alerting, by the IoT vulnerability monitor, an entity that the device status of the IoT device has changed to the vulnerable status.

7. The method of claim 6, further comprising performing a further vulnerability test of the set of vulnerability tests on the IoT device to determine whether the IoT device is vulnerable to a further known vulnerability, wherein the further known vulnerability is a port vulnerability, a protocol vulnerability, a security vulnerability, a software vulnerability, a secure sockets layer vulnerability, or an evil twin vulnerability.

8. The method of claim 6, further comprising determining the permissions level of the IoT device based, at least in part, upon the device category and the device status.

9. The method of claim 6, wherein the device status comprises the vulnerable status or a safe status.

10. The method of claim 6, wherein the permissions level of the IoT device comprises an unrestricted permissions level, an Internet-only permissions level, or the quarantine permissions level, and wherein changing the permissions level of the IoT device to the quarantine permissions level comprises changing the permissions level of the IoT device from either the unrestricted permissions level or the Internet-only permissions level to the quarantine permissions level.

11. A computer-readable storage medium comprising computer-executable instructions for an Internet of Things ("IoT") vulnerability monitor that, when executed by a processor, cause the processor to perform operations comprising:

scanning a home network address space of a home network for an IoT device;

determining a device category of the IoT device, wherein the device category comprises at least one of a managed category, an unmanaged category, or a guest category, wherein the managed category is associated with IoT devices certified through a certification process, wherein the unmanaged category is associated with IoT devices that are not certified through the certification process, and wherein the guest category is associated with IoT devices not previously associated with the home network;

determining, based on the device category of the IoT device, a set of vulnerability tests to be performed on the IoT device, wherein a different set of vulnerability tests is performed on another IoT device of a different device category;

performing a vulnerability test of the set of vulnerability tests on the IoT device to determine whether the IoT device is vulnerable to a known vulnerability, wherein performing the vulnerability test on the IoT device comprises sending a communications packet to the IoT device, receiving, in response to the communications packet, at least one parameter from the IoT device, analyzing the at least one parameter from the IoT device to identify an operating system of the IoT device, determining a known vulnerability specific to the operating system of the IoT device, wherein the known vulnerability comprises the known vulnerability specific to the operating system of the IoT device, exploiting the known vulnerability specific to the operating system of the IoT device, and observing a reaction of the operating system in response to exploiting the known vulnerability specific to the operating system of the IoT device to determine whether the operating system of the IoT device was patched for the known vulnerability specific to the operating system of the IoT device; and in response to determining that the IoT device is vulnerable to the known vulnerability, changing a device status of the IoT device to a vulnerable status and changing a permissions level of the IoT device to a quarantine permissions level, and alerting an entity that the device status of the IoT device has changed to the vulnerable status.

12. The computer-readable storage medium of claim 11, wherein the operations further comprise performing a further vulnerability test of the set of vulnerability tests on the IoT device to determine whether the IoT device is vulnerable to a further known vulnerability, and wherein the further the known vulnerability is a port vulnerability, a protocol vulnerability, a security vulnerability, a software vulnerability, a secure sockets layer vulnerability, or an evil twin vulnerability.

13. The computer-readable storage medium of claim 11, wherein the operations further comprise determining the permissions level of the IoT device based, at least in part, upon the device category and the device status.

14. The computer-readable storage medium of claim 11, wherein the device status comprises the vulnerable status or a safe status.

15. The computer-readable storage medium of claim 11, wherein the permissions level of the IoT device comprises an unrestricted permissions level, an Internet-only permissions level, or the quarantine permissions level, and wherein changing the permissions level of the IoT device to the quarantine permissions level comprises changing the permissions level of the IoT device from either the unrestricted permissions level or the Internet-only permissions level to the quarantine permissions level.

\* \* \* \* \*